(12) United States Patent
Zargelin

(10) Patent No.: US 12,204,361 B2
(45) Date of Patent: Jan. 21, 2025

(54) ABACUS AND MATHEMATICAL CALCULATING METHOD

(71) Applicant: Omar Ali Zargelin, Redford Township, MI (US)

(72) Inventor: Omar Ali Zargelin, Redford Township, MI (US)

(*) Notice: Subject to any disclaimer, the term of this patent is extended or adjusted under 35 U.S.C. 154(b) by 791 days.

(21) Appl. No.: 17/204,868

(22) Filed: Mar. 17, 2021

(65) Prior Publication Data
US 2021/0294372 A1 Sep. 23, 2021

Related U.S. Application Data

(60) Provisional application No. 62/990,736, filed on Mar. 17, 2020.

(51) Int. Cl.
*G06C 1/00* (2006.01)
*G09B 1/02* (2006.01)

(52) U.S. Cl.
CPC ............... *G06C 1/00* (2013.01); *G09B 1/02* (2013.01)

(58) Field of Classification Search
CPC .................................. G06C 1/00; G09B 1/02
USPC .......................................................... 434/203
See application file for complete search history.

(56) References Cited

U.S. PATENT DOCUMENTS

| | | | |
|---|---|---|---|
| 1,863,927 A * | 6/1932 | Konno | G06C 1/00 434/203 |
| 2,646,631 A | 7/1953 | Lazar | |
| 4,812,124 A | 3/1989 | Colodner et al. | |
| D680,294 S | 4/2013 | Boyer | |
| D797,847 S | 9/2017 | Zhang | |

(Continued)

FOREIGN PATENT DOCUMENTS

| | | | |
|---|---|---|---|
| CN | 209044420 U | | 6/2019 |
| JP | 2002304228 A | | 10/2002 |
| TW | 277064 U | * | 10/2005 |

OTHER PUBLICATIONS

Machine-assisted English language translation of Patent Publication No. JP 2002304228 A extracted from www.espacenet.com on May 10, 2021; 11 pages.

(Continued)

*Primary Examiner* — Peter S Vasat
*Assistant Examiner* — Stephen Alvesteffer
(74) *Attorney, Agent, or Firm* — Amburn Law PLLC; Dean W. Amburn

(57) ABSTRACT

The invention is directed to an improved abacus and related calculating method. The improved abacus and method are adapted to perform mathematical operations including addition, subtraction, multiplication, division and factoring. Additional mathematical operations are performable using described techniques. The improved abacus has a frame divided into an upper and lower section by a horizontal bar. The abacus includes a plurality of rods in which each rod contains four movable beads on the upper section of each rod and one movable bead on the lower section of each rod. The beads in the upper section have a value of two and the bead in the lower section has a value of one. Beads moved toward the bar are counted while those beads away from the bar are not counted. The improved abacus also includes a unit indicator, mathematical operational signs and positive and negative sliding indicators signs on the frame.

9 Claims, 25 Drawing Sheets

(56) References Cited

U.S. PATENT DOCUMENTS

D844,697 S      4/2019  Han
2002/0197590 A1* 12/2002 Gan ........................ G06C 1/00
                                                  434/189

OTHER PUBLICATIONS

Machine-assisted English language translation of Patent Publication No. CN 209044420 U extracted from www.espacenet.com on May 10, 2021; 3 pages.

* cited by examiner

ABACUS AND MATHEMATICAL CALCULATING METHOD

FIELD OF THE TECHNOLOGY

The present invention, in general, relates to a calculating device, and in particular, to an improved abacus that is easier to use, quicker to make calculations, suitable for today's educational system, and more accurate than other diverse methods of making mathematical calculations. More particularly, the invention relates to an abacus that embodies new features and functionalities for performing mathematical calculations using improved mathematical calculating methods.

BACKGROUND

Learning how to use an abacus stimulates the brain and helps with cerebral development. It is well established that utilizing an abacus improves a student's mathematical skills. This improvement is said to be due to the coordinated functioning of the brain's right and left hemispheres. The left brain is energized by calculating on the abacus. Such use also activates a learner's right brain by training the user to obtain a mental image and visual memory of the abacus. Using the right and left brain together helps a student learn to solve mathematical problems faster and more accurately. The skills taught by using an abacus enhance the student's cognitive abilities including response time and memory retention. However, the traditional methods of using an abacus have become antiquated under today's learning standards. There is opportunity to take a fresh and improved approach to the abacus including how it is used so that it will better mesh with current mathematics learning models while continuing to offer the advantages of using the student's right and left brain.

Abacuses are well known in the prior art, for example, a seven-bead Chinese abacus is more than 2,000 years old. It is widely viewed that the Chinese abacus was improved by a five-bead Japanese abacus, another ancient abacus that is being used to this day. The common application of these earlier abacuses relies on performing summation and subtraction calculations based on three rules, named, big friends, small friends, and a combination of small and big friends together. These rules are used when there are not enough beads in a column to perform addition and subtraction on the abacus. The term small friends refers to numbers that add up to a total of 5, and big friends are numbers that add up to a total of 10. These conventional rules are made to be used for reaching a result without considering whether the numbers used in the calculations are positive or negative. In particular, the Chinese abacus comprises a plurality of rods each containing two beads on the upper section and five beads on the lower section formed by the frame and a divider. The Chinese abacus can represent a hexadecimal system with sixteen different numbers on each rod from 0 to 15. It can also be used for a base 10 system. The beads are counted by moving them up or down towards a bar. Beads moved toward the bar are counted while those beads away from the bar are not counted. The use of a Chinese abacus is well known to those skilled in the art and needs no further discussion.

The Japanese abacus includes a frame divided into upper and lower sections by a bar that has multiple rods. Depending on where the unit indicator of the abacus is, the rods would numerically represent ones, tens, and hundreds thus following the base-10 numbering system. There is one bead on the upper section of each rod and four beads on the lower section of each rod. The bead in the upper section has a value of 5 and each bead in the lower section has a value of 1. The Japanese abacus also requires several rules for summation and subtraction. The use of a Japanese abacus is also considered to be well known to those skilled in the art.

Other variations of the Chinese and Japanese abacuses exist in the prior art. While these abacuses are well known and are well suited for many applications, they are not easy to learn and have several shortcomings including a lack of tracking negative numbers. It is also difficult to teach the use of commonly known abacuses. The difficulty of working with the rules of well-known abacuses together with the difficulty of teaching students how to use them has created performance demands that existing abacuses are unable to satisfy.

Thus, there exists a need for an improved abacus that provides superior performance and ease of use for making calculations. There is also a need for an improved method for making calculations using an abacus that avoids the constraints of the rules used for making calculations using conventional abacuses. This extends to the elimination of the rules using the small friends, big friends and combinations thereof to perform summation and subtraction operations since numbers cannot be even or odd at the same time. This applies to all digits (all columns in the abacus).

SUMMARY OF THE INVENTION

The purpose of the present invention, described subsequently in greater detail, is to provide an improved abacus and calculation method, which has many novel features. The improved abacus and calculation method are not anticipated, rendered obvious, suggested, or even implied by the prior art, either alone or in combination thereof. Users of the improved abacus will more easily be able to perform lengthy addition, subtraction, multiplication and division calculations using the improved calculating method.

The present unique and improved abacus includes a rectangular frame divided into an upper and lower section divided by a bar that runs horizontally. The abacus is expandable in the number of vertical rods depending on the intended level of the mathematical calculations being made. It has four beads on the upper section of each rod and one bead on the lower section of each rod. Each bead in the upper section has a value of 2 and the bead in the lower section has a value of 1. Thus, and advantageously, the improved abacus allows for easy recordation and manipulation of even and odd numbers. The beads are movable on the rods to indicate at least one selected value on the abacus and to perform calculations on the abacus.

The improved abacus includes mathematical operational signs that can be physically manipulated depending on the required operation to stand out prominently to the user. The operational signs are manipulation signs including positive, negative, division, and multiplication signs placed on the upper left corner of the abacus in the form of maker indicator. The marker could be a sliding indicator that is adapted to display a single mathematical operation at a time by hiding the other operations. The improved abacus further includes positive and negative mathematical signs on the right and left side of the abacus in the form of a marker indicator. The positive/negative marker could be a sliding selector where the sliding selector on the right side of the abacus represents the sign of the first number and the sliding indicator on the left side of the abacus represents the sign of the second number. A positive/negative sliding selector positioned on the middle top surface of the abacus represents the sign of the result of any calculation. This allows the user to keep track of both positive and negative numbers including the positive or negative result of any calculations.

In a nonlimiting embodiment, each selector is a small square-shaped structure horizontally positioned on the abacus. The selector can be moved left or right to display the positive or negative sign by covering and uncovering the sign. The present invention thus enables usage of positive and negative signs and the changeover from one sign to another is smooth and easy. The abacus also includes a unit indicator on the right-hand frame. The unit indicator is movable along the bar and is adapted to indicate the position of the one's unit, or one's rod. In a nonlimiting embodiment, the abacus further includes commas located on the bar of the abacus. A comma placed after each third column on the right hand-side of the abacus is adapted to represent currency. Commas located after every third column are used to allow for easier recognition of the numbers.

The invention further includes a method of calculation. Calculations can be done on both left and right sides of the abacus with the result being provided in the middle, or being provided on either side of the abacus. Calculations can also be performed on either side of the abacus depending on the value of the result. In a nonlimiting embodiment, the method comprises first clearing the abacus by moving all of the beads in the upper section to the top of the frame with a forefinger and all of the beads in the lower section to the bottom of the frame with a thumb; applying the required positive, negative, multiplication, or division sign of the mathematical calculation, and performing the mathematical calculation including the operations of addition, subtraction, multiplication and division.

In a nonlimiting embodiment, addition and subtraction operations are performed by first, adjusting the addition or subtraction operation on the upper left corner of the abacus; second, adjusting the positive/negative indicator sign of the first number on the right-hand side; third, adjusting the positive/negative indicator sign of the second number on the left-hand side; fourth, marking the unit indicator in the bar to display the position of the number; fifth, moving the beads up or down towards the bar by using the thumb to move the beads in the lower section up, and using the forefinger to move the beads in the upper section down depending on the numbers used in the operation; and sixth, reading the abacus by counting only the beads that have been moved towards the bar. For example, to set a number less than 10, you only need to count and move beads on the one's rod. To set the number 8, move four beads in the upper section of the one's rod down to the bar. The terms "set" or "setting" means to move the beads to the position that shows the number indicated.

In a nonlimiting embodiment, a multiplication operation is performed by first, adjusting the multiplication operation on the upper left corner of the abacus; second, adjusting the positive/negative indicator of the first number on the right-hand side; third, adjusting the positive/negative indicator of the second number on the left-hand side; fourth, setting the first number on the right side of the abacus by moving the beads up or down towards the bar by using the thumb to move the beads in the lower section up, and using the forefinger to move the beads in the upper section down depending on what numbers are involved in the operation; fifth, setting the second number on the left side of the abacus by moving the beads up or down towards the bar by using the thumb to move the beads in the lower section up, and using the forefinger to move the beads in the upper section down depending on what numbers are used in the operation; sixth, making the calculation in the middle section of the abacus by moving the unit indicator to the middle rod to indicate the position of the digits; seventh, copying the positions of the second number or the easier number to calculate in the middle section of the abacus; eighth, duplicating the first number or the uncopied number by the positioned value of the bead, for example, if the image of the second number includes a position of a bead with a value of 1, the first number will equal itself, and when the second number includes a position of a bead with a value of 2 (the value of the bead is read depending on its position on the rod in relation to the horizontal bar), the first number would duplicate itself; ninth, adding the total value of the duplicated numbers of the first number on the middle rod to obtain the result. Using this method of multiplication eliminates the need to know the multiplication table. Thus, the abacus will simplify the complex process of a multiplication operation since the result will be obtained by adding the total value of the beads after duplication.

In a nonlimiting embodiment, a division operation is performed by first, adjusting the division operation on the upper left corner of the abacus; second, adjusting the positive/negative indicator of the first number on the right-hand side; third, adjusting the positive/negative indicator of the second number on the left-hand side; fourth, setting the first number on the right side of the abacus by moving the beads up or down towards the bar by using the thumb to move the beads in the lower section up, and using the forefinger to move the beads in the upper section down depending on the numbers of the operation, setting the second number on the left side of the abacus by moving the beads up or down towards on the bar by using the thumb to move the beads in the lower section up, and using the forefinger to move the beads in the upper section down depending on what numbers are used in the operation; fifth, marking the calculation in the middle section of the abacus by moving the unit indicator on the right to the middle section of the abacus to indicate the unit's rod position of the numbers; sixth, marking the indicator first with the same digit as the divisor on the middle rod in the middle section of the abacus and then duplicating the divisor's left digit by the value of the bead on the middle rod to check if it is at least equal to the dividend. If it is, proceed with the seventh step of duplicating the divisor starting with the bead position of the left digit on the rod that is marked by the unit indicator, based on the digits of the divisor, until the value of the duplication equals or is closest to the value of the dividend. Eighth, move the right bead on the rod until an equal or close enough value of the dividend is reached. Lastly, reading the final result with the values of the beads based on their position on the rods.

When duplicating the digit of the divisor by itself, if the result is too far off from the amount of the dividend, then move left to the ten's rod and duplicate the divisor by the value of the bead. If the result after the duplication is too close to the value of the dividend, move right to the beads in the right rod until reaching the value of the dividend. The result is read by reading the value of the beads. If there is a reminder, the remainder is read with a decimal point.

In other instances, when duplicating the divisor by itself and reaching a result that is too close to the dividend, and if duplicating the divisor again would result in a number bigger than the dividend, just include the remainder of the number with a decimal point. Move the unit digit to the tenth's rod which means adding zero in normal calculation.

In another nonlimiting embodiment, for division, the following method can also be used. As a normal method that a student may learn in our educational system, first, compare the same digit of the divisor with the same digit from the left side of the dividend. If the left digit of the dividend is equal or bigger than the divisor, proceed with duplicating the divisor until we reach the number or a close enough number to the number of the dividend. If there is a reminder, the reminder will be included with the next digit on the right of the dividend; then, keep duplicating by the position of the bead until the result is reached, which is the number of the dividend. If the dividend contains additional digits, keep including the reminder until the reminder is zero or smaller than the divisor. Next, convert the final reminder to a decimal point in the answer and read the answer with the actual value of the bead's positions.

If the difference between the number of the digits of the dividend is less than the divisor, add the next digit to the right of the dividend, then proceed with the same method explained above.

For these reasons and as further explained, the invention includes an improved method of making calculations using an abacus. The abacus represents and performs calculations with both even and odd numbers. When summing even and odd numbers there are only four possibilities for whether the result will be even or odd. For example, if the two numbers to be summed are both even or odd, their sum is always an even number. If the numbers are different: even plus odd, or odd plus even, their sum is always an odd number.

Since the result is known in advance that it will be either even or odd, the previous rule can be reduced by relying on even numbers only (for example, 2, 4, 6, and 8) either in addition or subtraction. This can be applied directly when the number that is intended to be subtracted or added is an even number, and this can also be applied to odd numbers (added or subtracted) by converting an odd number to even number by adding or subtracting 1 from the odd number.

For example, adding two odd numbers whose result is under 10 can be done on the abacus directly without the movement of the beads that represent the first number whether the number is an even or an odd number, because odd numbers such as 1 and 3 can be added and the result will be an even number (1+3=4) without having to move the bead on the lower section that represents the number one, especially when it is done by visualizing the abacus.

Further, the process for addition and subtraction for all numbers is improved with the possibility of performing all operations regardless of the sign of the result, whether it is positive or negative. This was not possible, or it was complicated when using prior methods of use on prior abacuses. Thus, the representation of negative numbers and operations on such numbers is made easier with the improved abacus and method.

Further, the abacus is useful for performing calculations of numbers with different signs, and knowing the sign of the result from the mathematical operation, meaning you can do the operation with the absolute value of the numbers.

Further, the process for multiplication and division for all numbers can be done whether the numbers are negative or one of them is negative. If the signs of both numbers are the same, whether negative or positive, the answer will be positive. If the signs of the numbers are different, then the result will be a negative number. Thus, all operations, both negative and positive can be done by assigning the sign of the product first and then performing the operation. Since the sign of the answer is known, the operation of the numbers is done as the absolute value of those numbers. The sign of the result will be added at the end of the operation or it can be added prior to starting the operation.

Further, with the improved abacus, the user does not encounter the complications of using and memorizing the multiplication table as all multiplication operations can be done on this abacus as duplicates of a number and then adding the duplicated numbers together. Moreover, multiplication of big numbers can be done in an easy and fast manner because the steps of multiplication are reduced dramatically. Instead of multiplying a digit by digit in classic multiplication or by the methods used with prior art abacuses, the present invention duplicates the larger number, or the smaller number if the image of the larger number is easier to read, by a value of the beads of the smaller number and the product is the same number of beads as the smaller number. The number represented by the beads would be read by doubling the amounts in accordance to the bigger number to reduce the summation steps and to add the result, which is easier since the multiplication process is cumulative.

Further, if the smaller number is made of two or more digits, the bigger number is duplicated by the first digit from the left of the smaller number, then the step of duplicating the bigger number is performed again but this time, by the next digit position of the smaller number, and so on, until completed. The product is represented by beads on a suitable rod. Thus, the benefit of the improved abacus is the ability to duplicate the whole number with the left digit bead position of the second number and until completed, instead of multiplying digit by digit in classic multiplication. In addition, in many cases you can use the sum of duplication of the left digits to get the value of duplication for the right digit to save time. In addition, you can use some multiplication properties to solve the mathematical operation faster.

Further, the present invention is a very helpful tool in finding simplified fractions. In order to solve problems with fractions, when both the numerator and the denominator are even, meaning that they are divisible by the number 2, reduce the numerator and denominator number until the numerator or the denominator becomes an odd number or a prime number that it is no longer possible to simplify anymore. When one or both numerator and denominator are odd, think about odd and/or even common factors. You can then reduce the number until the numerator or the denominator or both become a prime number.

Since the numbers on the abacus can be formed as an image in the right part of brain, it is very easy to compare two numbers or more to find if a number is greater than (>), less than (<) or equal (=) to a second number. It is also very easy to organize the numbers in order from lowest to highest or vice versa and to find the minimum, maximum, mean, median, and mode.

The improved method of using an abacus can play a future role in solving all mathematical calculations or at least most math equations such as linear equations and matrixes. For example, to find the value of $X^a$, calculate the value of $X^2$ times $(X^{a-2})$ then find the value of $X^2$ times itself, and multiply it with the remainder of $X^a$. Depending on the value of the power $a$, mathematical matrices form the image of $X^a = X^2 \cdot X^{(a-2)}$. For example, $X^{16} = X^2 \cdot x^8 = (X^2)^2 \cdot x^4 = X^4 \cdot X^4 = X^{16}$. Another example is $X^{32} = X^2 \cdot x^{16} = (X^2)^2 \cdot X^8 = (X^4)^2 \cdot X^4$ which simplifies to using $X^2$ and $X^4$ calculation rules.

Therefore, the present invention reduces the steps of operation from 32 steps to 4 steps. This rule can also be used in finding the roots of number.

Further, converting fractions into decimals is simpler when using the present invention. For multiplication or division, there are two approaches to reach the result. The first approach is accomplished by dividing the numerator by the denominator. The second approach is to determine if the denominator is a number that can be multiplied by another number to become 10, or its multiples, then the numerator is multiplied by this number, and a decimal point is placed in front of the result of the nominator.

Further, with the improved abacus and method, even the division operation is easier than when using prior art abacuses and related methods of calculation. Since division is the opposite operation of multiplication, the dividend is found as a result of multiples of the divisor.

Further, with the improved abacus and method, factors can be found very simply because of the beads that represent the number 2.

To solve the value of the variable X, duplicate the number adjacent to the X with itself until reaching the result displayed after the equal sign. Read the result by the value of the original beads. For example, for 5X=30, duplicate 5 by itself one time to obtain the value of 10 and move beads with the new value of 10 towards the bar until reaching 30, then read the result by the original value of the beads, which equals 6.

To solve percentage problems, the percentage can be considered as a fraction with a denominator equal to 100, or can be considered as a decimal. The abacus can help solve percentage problems, such as calculating percentages for prices differentials of discounted items and marked up products. For example, where a percentage is considered as a fraction, such as solving 20% of the total cost of eighty dollars ($80), the result can be reached by using the formula of the sale price=total price−(discount percentage×total cost). For example, total price=80−(20/100×80)=80−16=64. Alternatively, the result can be reached by using the formula of sale price=(100%−discounted percentage)×total price. As an example, such as a sale price=(100%−20)×80=80%−80=64.

Converting a percentage into a decimal, for example 80% can be found where 80/100=8/10 and then dividing by using the method used for division which will result in a value equal to 4/5. For converting a fraction to a percentage for a multiplication or division operation, when a denominator is a number that can be multiplied by another number to become 10 or its multiples, the numerator is multiplied by that number. Therefore, as an example, 100 is 5×20, convert the fraction 3/5 to a decimal fraction by multiplying the nominator three (3) by twenty (20) and the denominator five (5) by twenty (20). The result being 60/100, which is 0.6 in decimals.

Solving matrices can also be done using the improved abacus by using the methods described in the present invention with a calculation formula. The first number can be assigned on the left side of the improved abacus and second numbers can be assigned on the right side of the improved abacus and the result will be calculated in the middle section of the improved abacus.

Thus, it is an object of this invention to reduce the number of rules in a method for making calculations to enable trainers to teach students how to conduct mathematical operations more efficiently and reduce the time to get the correct result.

It is another object of the present invention to use the improved abacus to learn the mathematical methods provided in present invention and then use the provided improved abacus as a mental teaching system depending on the level of the user's education. It is not possible to teach the methods provided in the present invention without learning, using, and exercising on the improved abacus first.

It is another object of the present invention to provide such an improved abacus and related calculations method which will help students comprehend the even and odd numbering system. Since there is only one bead that represents the number one (1), the bottom bead is the deciding bead of whether a number is even or odd. This accelerates the process of learning the numbering system for students, especially younger students.

It is yet another object of the present invention to provide a method for achieving skills for making faster calculations that can be performed many times faster than making calculations using an electronic calculator, and without using a pen and paper.

It is still another object of the present invention to provide a teaching tool that will offer a solid foundation for the language of math in primary and high schools. Due to the improvements, the improved abacus and method makes mathematics useful and fun.

It is further an object of the present invention to provide an improved abacus that provides a solid learning foundation for addition, subtraction, multiplication, and division.

It is further an object of the present invention to provide an improved abacus and calculating method that improves problem-solving skills.

It is further an object of the present invention to provide an improved abacus and calculating method that is easy to use and relatively inexpensive.

It is further an object of the present invention to provide an improved abacus and calculating method that improves the visual (photographic) memory of the user.

It is further an object of the present invention to provide an improved abacus and calculating method that sharpens listening skills.

It is further an object of the present invention to provide an improved abacus and calculating method that teaches improved logical reasoning.

It is further an object of the present invention to provide an improved abacus and calculating method that increases endurance for stress and pressure.

It is further an object of the present invention to provide an improved abacus and calculating method that sharpens concentration and observance.

It is further an object of the present invention to provide an improved abacus and calculating method that develops a student's confidence and self-esteem because it helps a learner become smarter than non-abacus users.

It is further an object of the present invention to provide an improved abacus and calculating method that teaches discipline and reasoning skills that consequently improve a student's reading and writing skills.

It is further an object of the present invention to provide an improved abacus and calculating method that increases memory function and sharpens overall mental acuity.

It is further an object of the present invention to provide an improved abacus that can be used by people of all ages and improve their math skills and other skills as described above.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE DRAWINGS

Reference will now be made to the drawings in which the various elements of the present invention will be given numeral designations and in which the invention will be discussed to enable one skilled in the art to make and use the invention.

Figure 1:
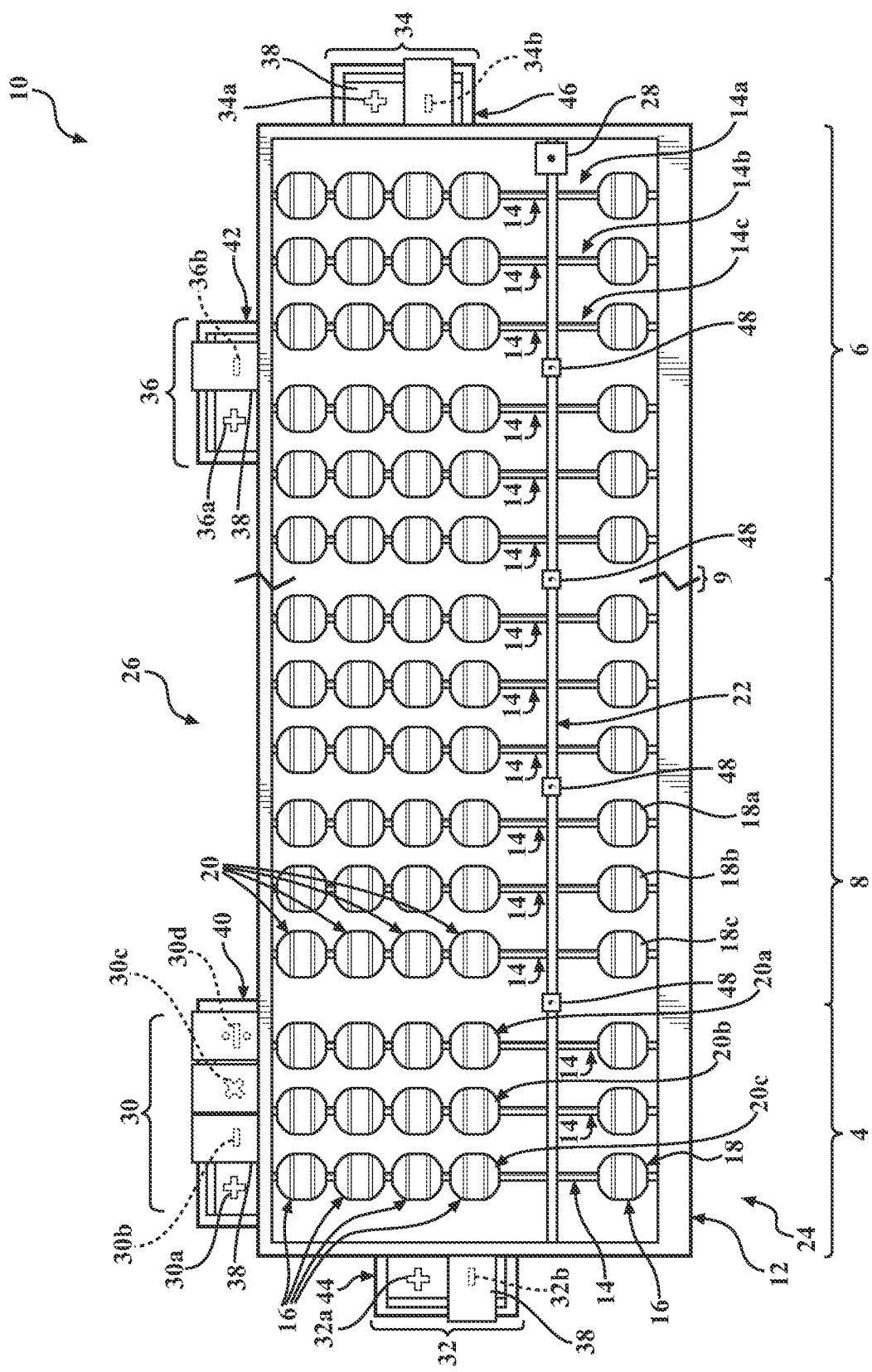
FIG. 1 shows a front view of an improved abacus in accordance with a nonlimiting embodiment of the invention.
Figure 2:
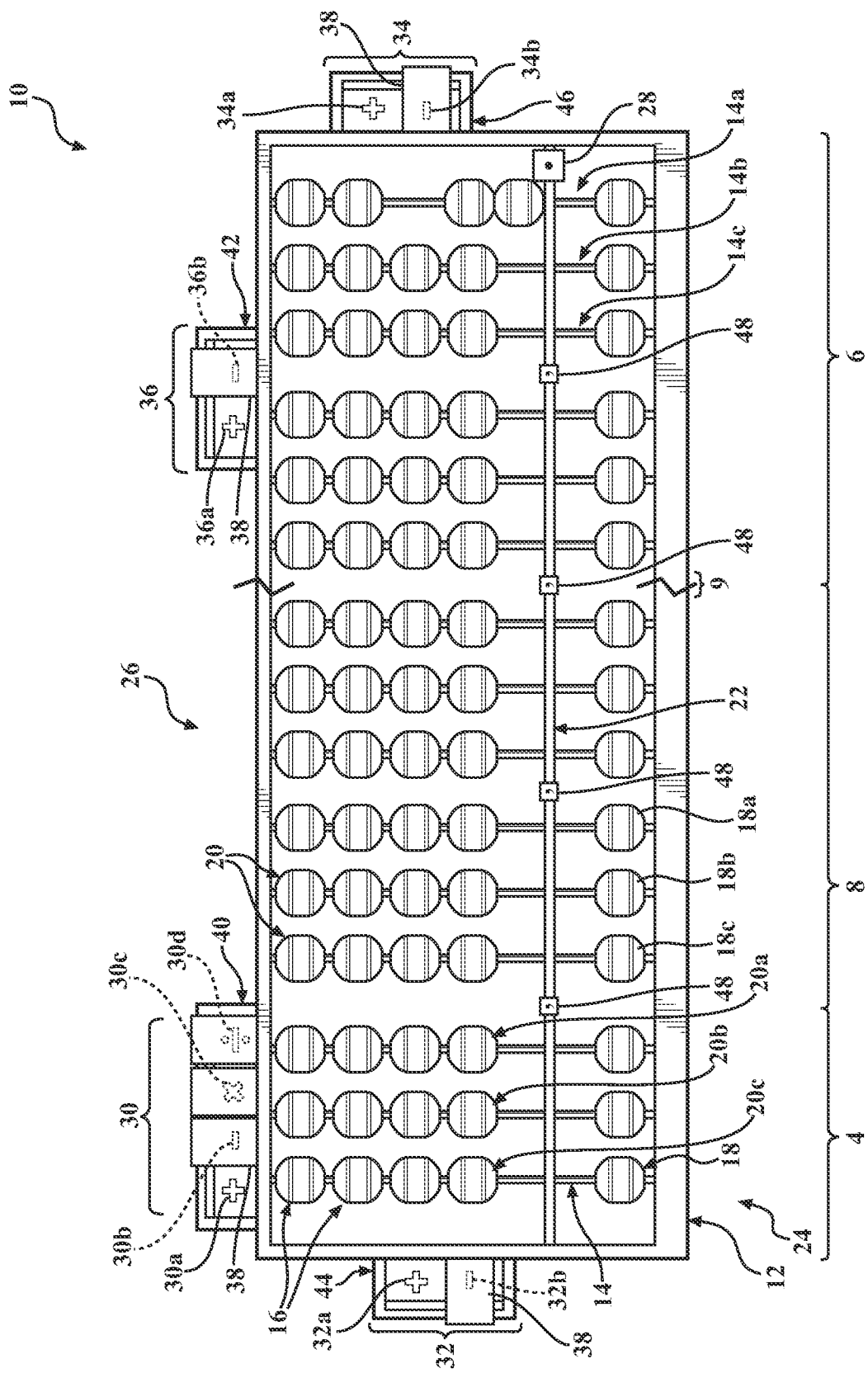
FIG. 2 shows an example of an addition operation using the beads of the improved abacus in accordance with a nonlimiting embodiment of the invention.

Referring to FIG. 1 an improved abacus 10 of the invention is intended for use by an individual to make mathematical calculations. The improved abacus 10 is also, a teaching tool to help students learn math. In a nonlimiting embodiment, the improved abacus 10 has a frame 12 with twelve vertical rods 14 (columns). The frame 12 of the abacus 10 has a left section 4, a right section 6, and a middle section 8. Each of the left section 4, right section 6 and middle section 8 include a certain number of the vertical rods 14. The number of vertical rods in each of the left section 4, the right section 6 and the middle section 8 can vary and is not limited to what is depicted in FIG. 1, or any of the other figures. Further, the abacus 10 is expandable 9 in its width so that the total number of vertical rods 14 can be more than twelve. It is the express intent of the invention to allow for expandability of the number of columns so that mathematical operations of large numbers can be performed. Each of the vertical rods 14 has five (5) movable beads 16. The improved abacus 10 operates using a system where each rod 14 represents a column of numbers. For example, starting from the right and moving left, the first rod 14a represents a one's rod, the second rod 14b represents a ten's rod, the third rod 14c represents a hundred's rod, and so forth. A horizontal bar 22 is perpendicular to the vertical rods 14, separating the abacus into two unequal sections including a lower section 24 and an upper section 26. The movable beads 16 are located above and below the horizontal bar 22. Each rod 14 of the improved abacus 10 has four upper beads 20 on the upper section 26 and one bead 18 on the lower section 24. Each upper bead 20 in the upper section 26 has a value of two (2) and the bead 18 in the lower section 24 has a value of one (1). The improved abacus also includes a unit indicator 28 (decimal point marker) on the right-hand side of the frame 12. The unit indicator 28 is adapted to move along the bar 22 in order to indicate the position of the unit (one's units) to the left of the unit indicator 28. When the unit indicator 28 is set to a position on the bar 22, the first bead in the lower section 24 where the unit indicator is marked represents a one's unit bead 18a, the second bead 18b to the left of the one's bead represents the ten's bead, the third bead 18c to the left of the ten's bead represents a hundred's bead, and so forth. The first bead in the upper section 26 represents a one's (or single unit) bead 20a, the second bead 20b to the left of the one's bead represents ten's bead, the third bead 20c to the left of the ten's bead represents a hundred's bead, and so forth. The abacus 10 further includes comma separators 48 located across the bar 22 of the abacus after every three columns. The commas located after every third column are used to allow for easier recognition of the numbers.

To indicate the number one (1) on the abacus, the lower bead 18 would be moved up to the bar 22 with the thumb. For the number two (2), the upper bead 20 is moved down to the bar 22 with the forefinger. Representing the number 3 requires moving the bottom bead 18 up, which represents the number 1 and one upper bead 20, which represents the number 2 is moved down to the bar 22. Representing the number 22 requires moving one upper bead 20 on the first rod 14a and one upper bead 20a on the second rod 14b down to the bar. Representing the number 222 would require moving down one upper bead 20 on the first rod 14a, one upper bead 20a on the second rod 14b, and one upper bead 20b on the third rod 14c. The unit indicator 28 is movable to determine the location of the unit (single digit).

The improved abacus 10 includes operational signs 30 represented by mathematical symbols for addition 30a, subtraction 30b, multiplication 30c and, division 30d. The operational signs 30 are placed on the upper left corner 40 of the abacus 10 in the form of a slider or sliders 38 which are adapted to be moved to indicate the type of the operation to be performed by the user. The improved abacus 10 includes on the left side a positive/negative sliding sign indicator 32 to represent a positive sign 32a or a negative sign 32b of a second number positioned on the left side 44 of the abacus 10. On the right side 46 of the abacus 10 a positive/negative sliding sign indicator 34 represents a positive sign 34a or a negative sign 34b of a first number. Near the middle of the abacus, a positive/negative sliding sign indicator 36 represents a positive sign 36a or a negative sign 36b of the calculated result of the first number and second number on the abacus 10.

With added reference to FIGS. 2 to 6, examples of how addition operations are to be performed on the abacus 10 in forms including, addition of: two even numbers; an odd number and an even number; two even numbers; and two odd numbers. In using the improved abacus 10 it is set on a rigid medium (not shown), for example, a table. Prior to use, all the beads in the lower section are moved to the lower base and all the beads in the upper section are moved to the upper base. An addition calculation is performed by moving the appropriate beads towards the bar. To illustrate the use of the invention through an example, with particular reference to FIG. 2, to add two (2) and two (2); first, assign the addition sign 30a on the upper left side corner 40 of the abacus 10 as shown in FIG. 1; next, perform the addition operation by setting the number 4 by using the forefinger to move two upper beads 20 on the one's rod 14a of the upper section 26 down to the bar 22. Then, read the final result by adding the values of the moved beads based on their position on the rods, which equals four (4).

Figure 3:
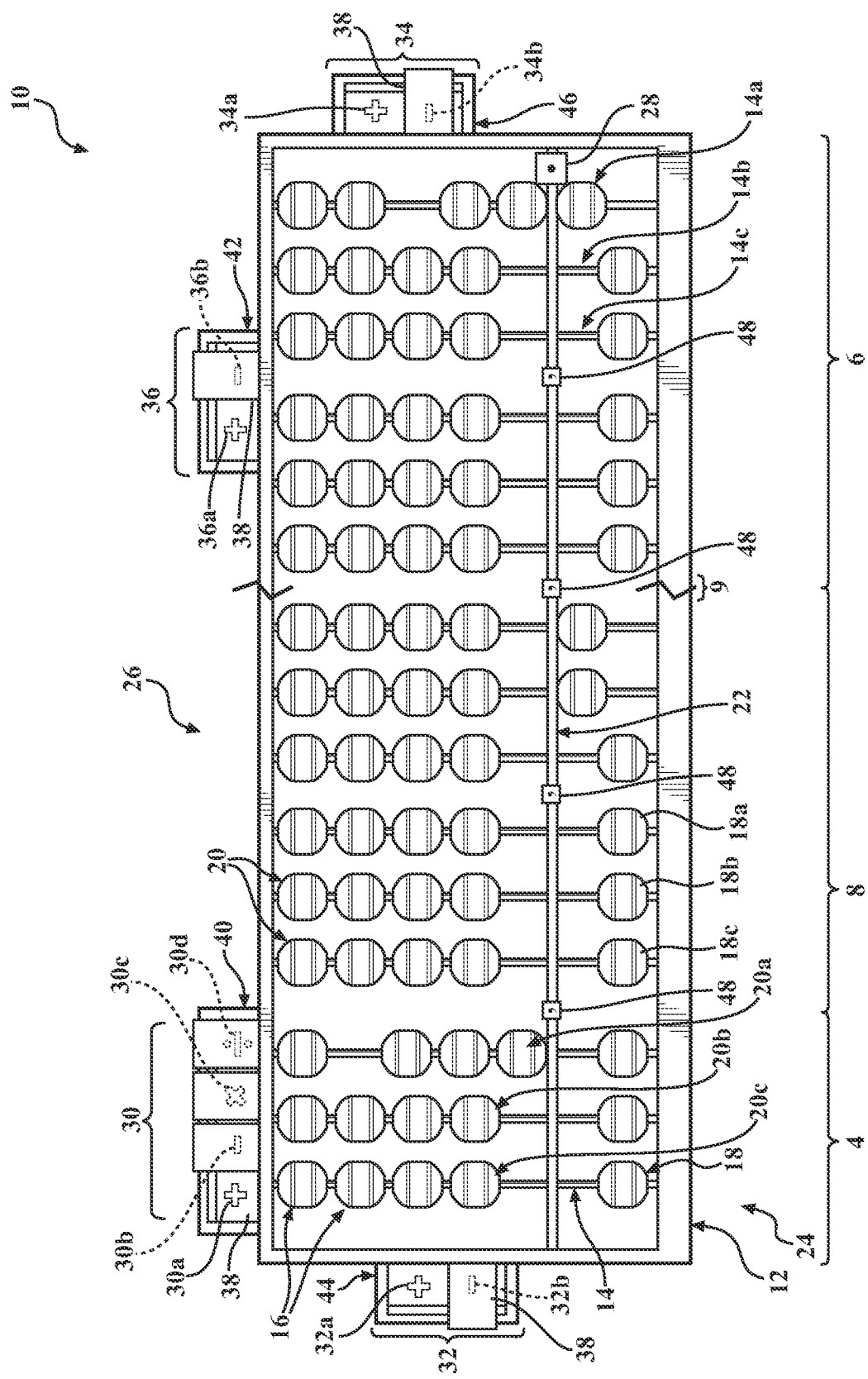
FIG. 3 shows another example of a mathematical operation using the beads of the improved abacus in accordance with a nonlimiting embodiment of the invention.

Now with emphasis on FIG. 3, the addition operation of an odd and even number is described. To add the numbers five (5) and six (6), first, assign the addition operation sign 30a on the upper left side corner 40 of the abacus 10 and set the number 5 by moving two upper beads 20 on the upper section 26 on the one's rod 14a down to the bar 22 and move up the bead 18a on the lower section 24 on the one's rod 14a to the bar 22. Next, to add the number 6, use the rod on the left side of the abacus to set the second number 6 by moving three beads 20a on the upper section 26 on the one's rod 14a down to the bar 22. Next, read the final result by adding the values of the moved beads based on their position on the rods, which equals eleven (11).

Figure 4:
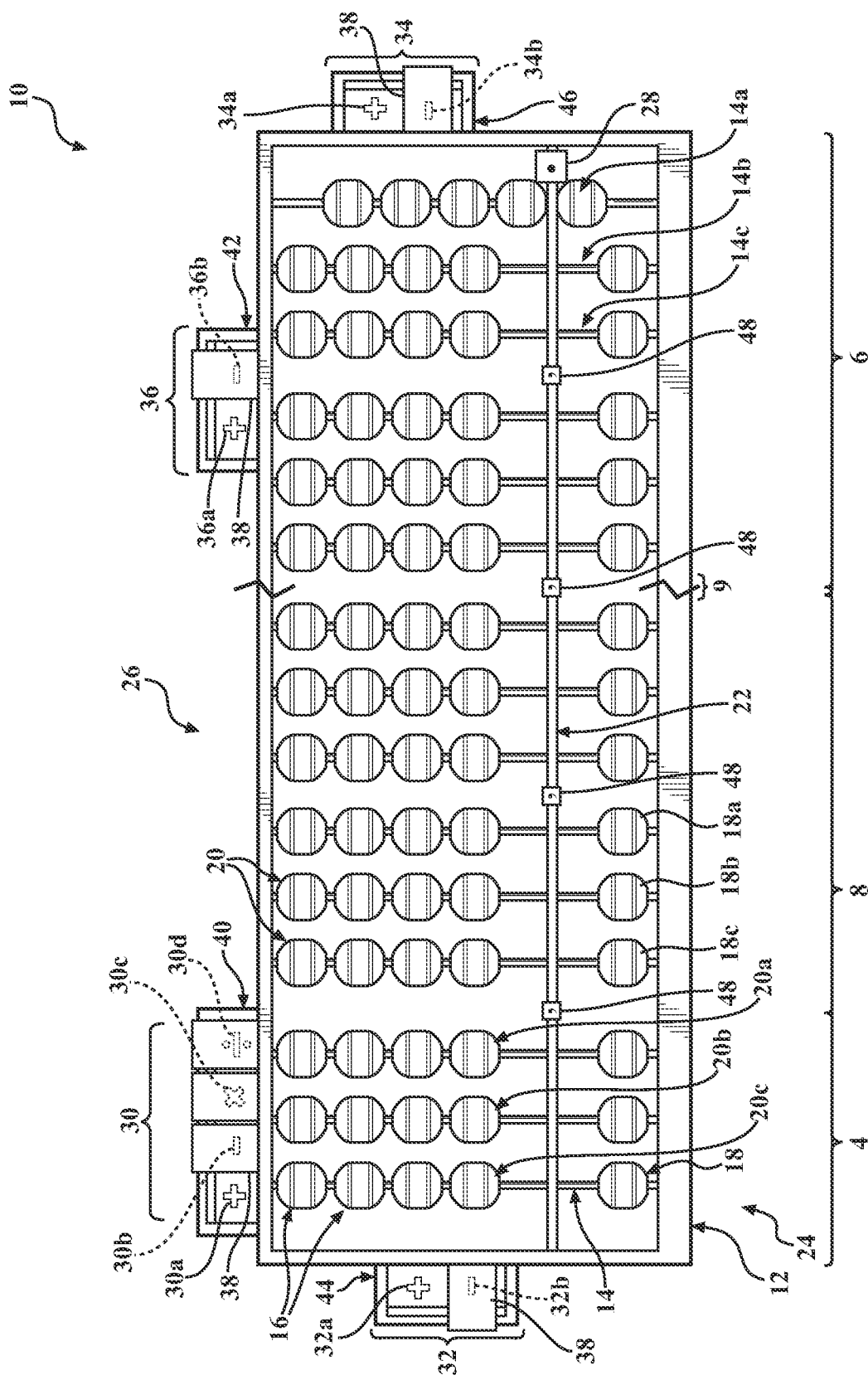
FIG. 4 shows another example of a mathematical operation using the beads of the improved abacus in accordance with a nonlimiting embodiment of the invention and depicting the steps used in an addition operation of an even and odd number of 4 and 5.

With emphasis on FIG. 4, the addition operation of an even and odd number is described. To add the numbers four (4) and five (5), first, assign the addition operation sign 30a on the upper left side corner 40 of the abacus 10 and set the number 4 by moving two beads 20 on the upper section 26 on the one's rod 14a down to the bar 22. To add 5, move up the lower bead 18a on the one's rod 14a to the bar 22 and two beads 20 on the upper section 26 on the one's rod 14a down to the bar 22. Next, read the final result by adding the values of the beads based on their position on the rods, which equals nine (9).

Figure 5:
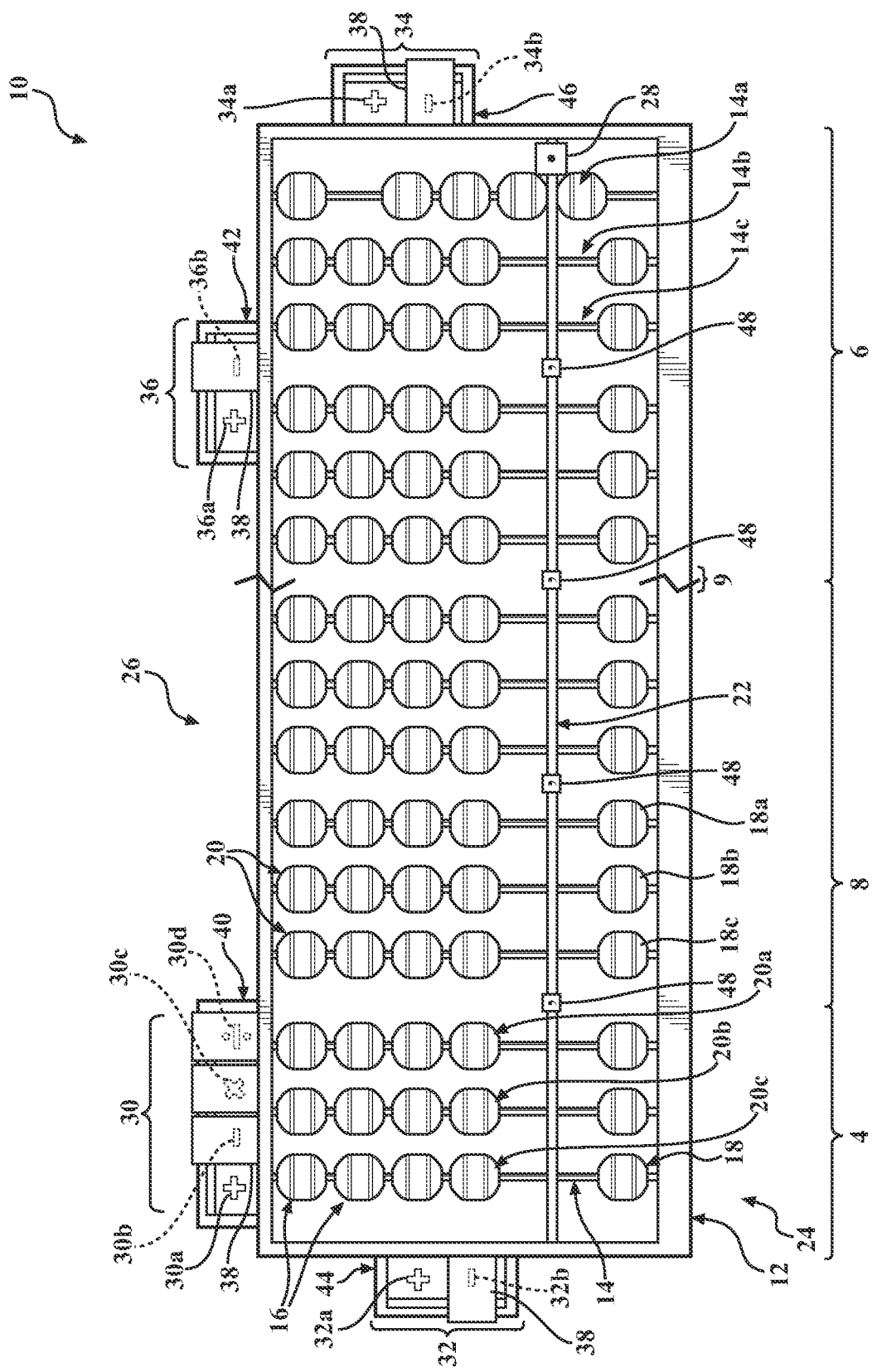
FIG. 5 shows another example of a mathematical operation using the beads of the improved abacus in accordance with a nonlimiting embodiment of the invention and depicting the steps used in an addition operation of an odd and odd number of 1 and 5.

With emphasis on FIG. 5, the addition operation of odd numbers is described. To add the numbers one (1) and five (5), first, assign the addition operation sign 30a on the upper left side corner 40 of the abacus 10 and set the number 1 by moving up the lower bead 18a on the one's rod 14a to the bar 22. To add the number 5, move the lower bead 18a back to its normal position to the base of the frame 12 by using the thumb and move three beads 20 on the upper section 26 on the one's rod 14a down to the bar 22. Read the final result by adding the values of the moved beads based on their position on the rods, which equals to six (6).

Figure 6:
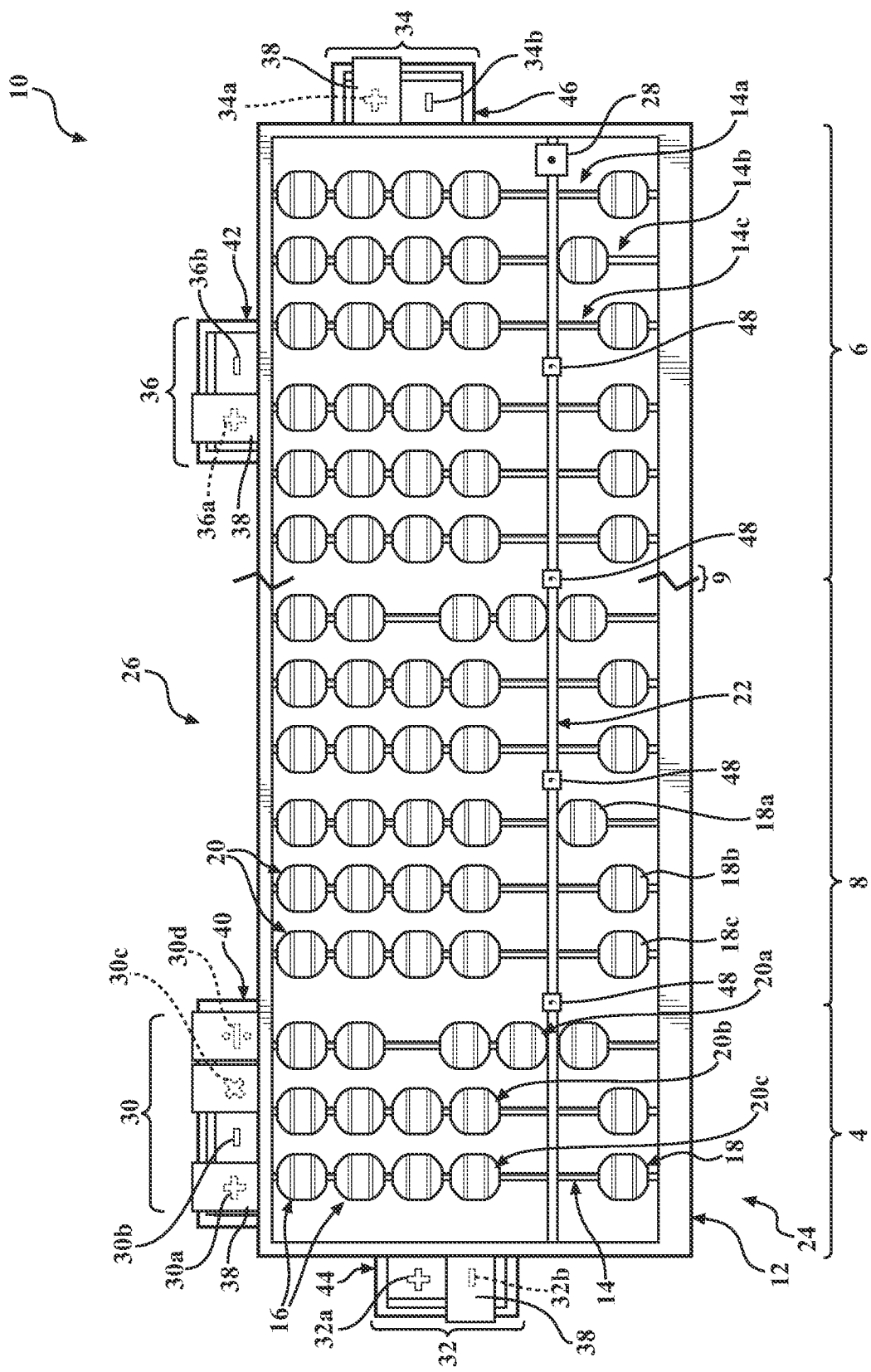
FIG. 6 shows another example of a mathematical operation using the beads of the improved abacus in accordance with a nonlimiting embodiment of the invention showing a negative result from adding a positive and negative number of 5 and −10.

Now with emphasis on FIG. 6 the addition operation of a positive and a negative number is described. To add the numbers five (5) and negative ten (−10), first, assign the addition operation sign 30a on the upper left side corner 40 of the abacus 10 and assign the positive sign 32a on the left side 44 of the abacus 10 to the second number five (5) and the second sign 34b on the right side 46 of the abacus 10 to the first number negative ten (−10). For the calculation, begin with the bigger number by setting the number ten (10) by moving up the lower bead 18 on the ten's rod 14b to the bar 22 on the right-hand side of the abacus. Next, setting five (5) on the right-hand side of the abacus 4 by moving up the lower bead 18a on the one's rod 14a to the bar 22 and moving down the upper bead 20a down to the bar 22. To add the number five (5) and negative ten (−10), move down the lower bead 18b on the ten's rod 14b back to its normal position to the base of the frame 12, calculate the result in the middle section 8 by using the thumb to move up the lower bead 18a on the one's rod 14a to the bar 22. Next, use the forefinger to move down two beads 20 on the upper section 26 to the bar 22. Read the final result by adding the values of the moved beads based on their position on the rods, which equals five (5).

With additional reference to FIGS. 7 to 10, an approach for using a subtraction operation in the form of two even numbers, an odd and even numbers, two even numbers and two odd numbers is described.

Figure 7:
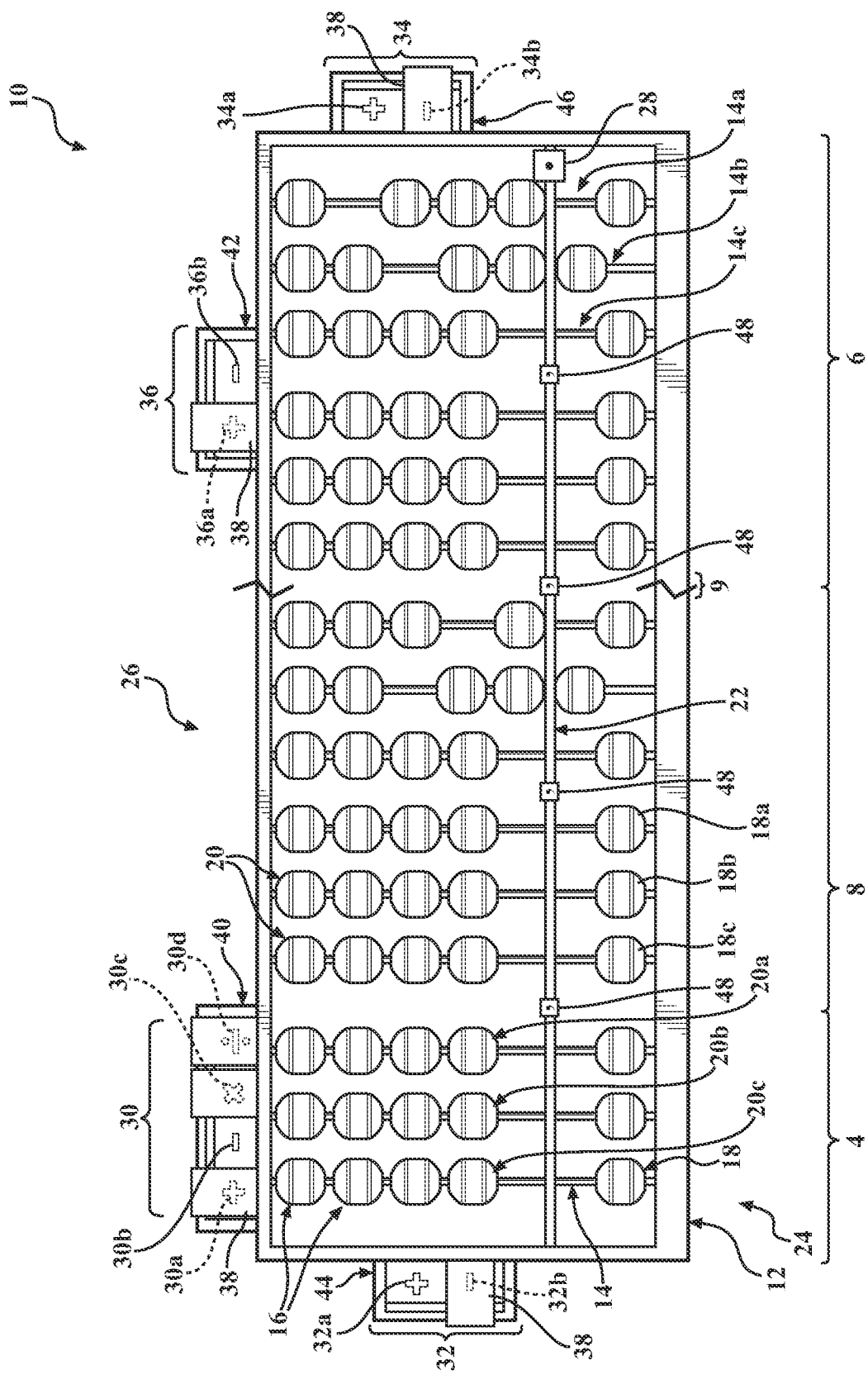
FIG. 7 shows another example of a mathematical operation using the beads of the improved abacus in accordance with a nonlimiting embodiment of the invention and depicting the steps used in the subtraction of even numbers 56 and 4.

With emphasis on FIG. 7, the subtraction operation of two even numbers is described. To subtract the numbers fifty-six (56) and four (4), first, assign the subtraction operation sign 30b on the upper left side corner 40 of the abacus 10. Second, set the number fifty-six (56) by moving three beads 20b on the upper section 26 on the ten's rod 14b down to the bar 22 and moving up a bead 18a on the lower section 24 on the one's rod 14a to the bar 22 to represent the number fifty-six (56). To subtract the numbers fifty-six (56) and four (4), move back two beads 20 on the one's rod 14a to its normal position. The result, as represented by the values of the beads is fifty-two (52) as shown in the middle section 8 of the abacus.

Figure 8:
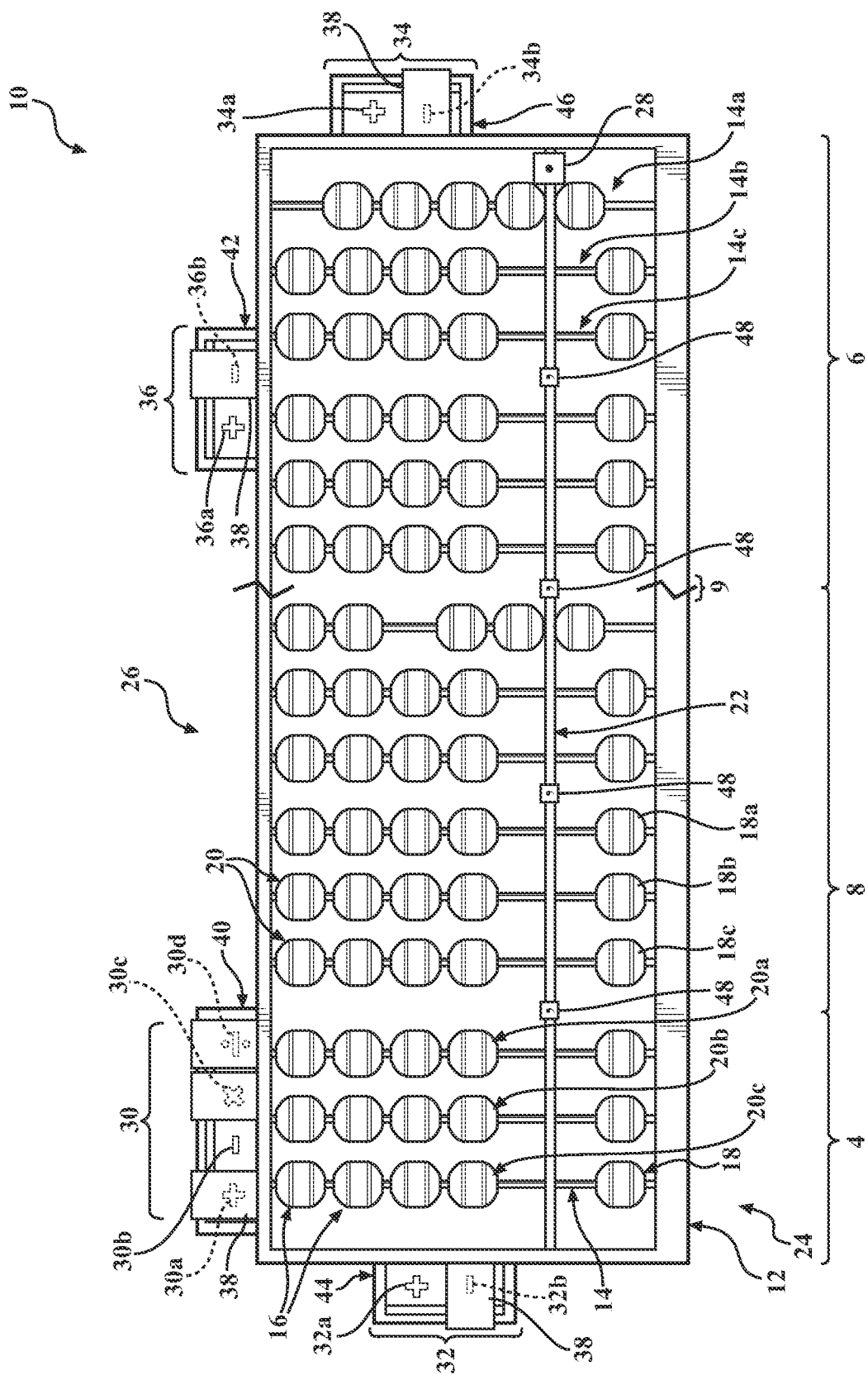
FIG. 8 shows another example of a mathematical operation using the beads of the improved abacus in accordance with a nonlimiting embodiment of the invention and depicting the steps used in the subtraction of an odd and even numbers 9 and 4.

Now with emphasis on FIG. 8, the subtraction operation of an odd and even number is described. To subtract the numbers nine (9) and four (4), first, assign the subtraction operation sign 30b on the upper left side corner 40 of the abacus 10. Second, set number nine (9) by moving four beads 20 on the upper section 26 on the one's rod 14a down to the bar 22 and moving up the bead 18a on the lower section 24 on the one's rod 14a to the bar 22. To subtract number four (4) from nine (9), remove the last two beads 20a on the upper section of the one's rod back to its normal position. The result as representing by the remaining beads will read as number five (5) as shown in the middle section 8.

Figure 9:
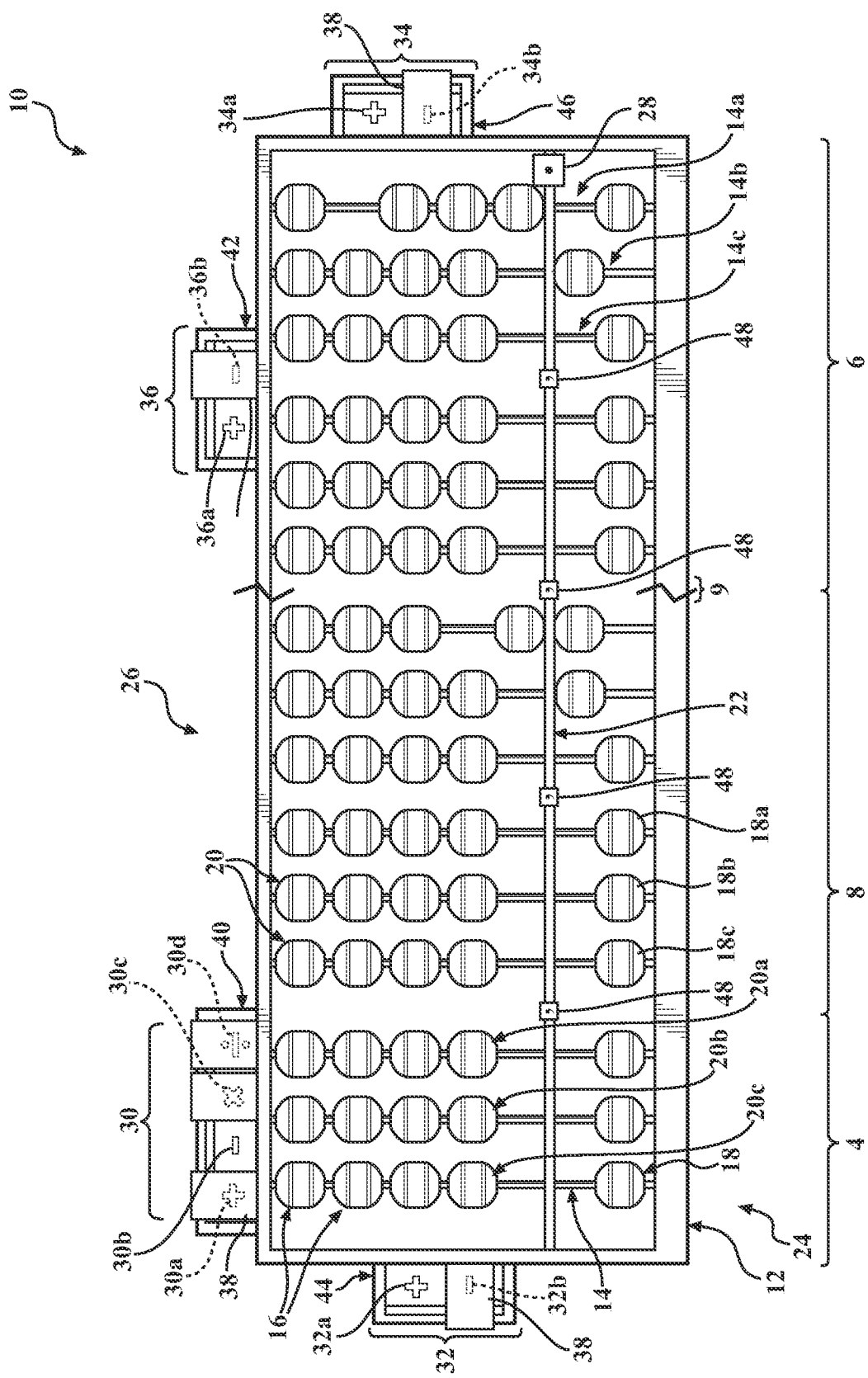
FIG. 9 shows another example of a mathematical operation using the beads of the improved abacus in accordance with a nonlimiting embodiment of the invention and depicting the steps used in the subtraction of an even and odd numbers 16 and 3.

With emphasis on FIG. 9, the subtraction operation of an even and odd number is described. To subtract the numbers sixteen (16) and three (3), first assign the subtraction operation sign 30b on the upper left side corner 40 of the abacus 10. Second, set the number sixteen (16) by moving up the bead 18b on the lower section 24 on the ten's rod 14b to the bar 22, and moving three beads 20a on the upper section 26 on the one's rod 14a down to the bar 22. To subtract the numbers three (3) from sixteen (16), remove two beads 20a on the upper section 26 on the one's rod 14a back to its normal position and move up one bead 18a on the lower section 24 of the abacus to the bar 22. The result as represented by the remaining beads is thirteen (13) as displayed in the middle section 8.

Figure 10:
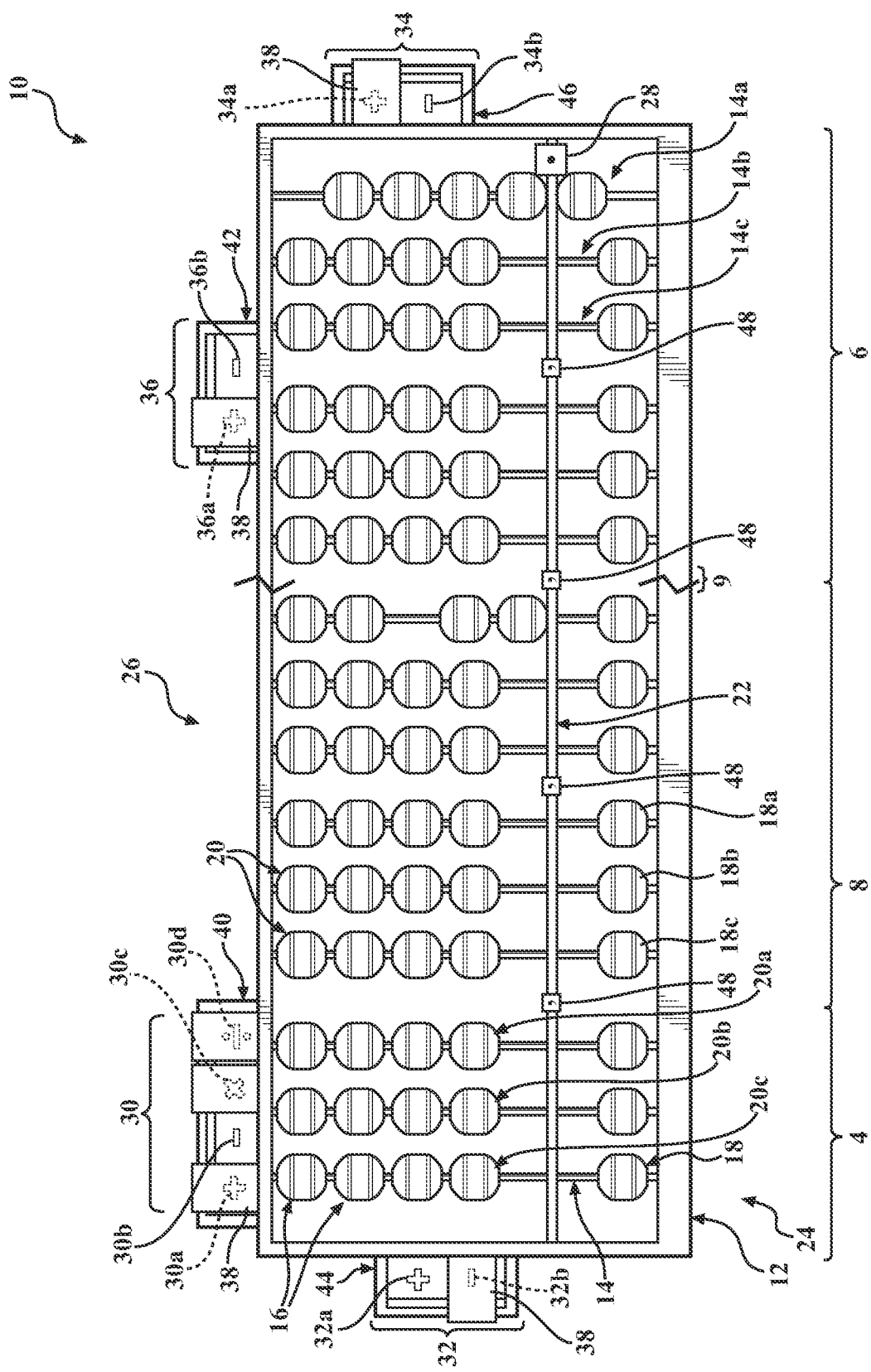
FIG. 10 shows another example of a mathematical operation using the beads of the improved abacus in accordance with a nonlimiting embodiment of the invention and depicting the steps used in the subtraction of an odd and odd numbers 9 and 5.

With emphasis on FIG. 10, the subtraction operation of two odd numbers is described. To subtract the numbers nine (9) and five (5), first, assign the subtraction operation sign 30b on the upper left side corner 40 of the abacus 10. Second, set the number nine (9) by moving up the bead 18a on the lower section 24 on the one's rod 14a to the bar 22, and moving 4 beads 20 on the upper section 26 on the one's rod 14a down to the bar 22. To subtract the number five (5) from nine (9), move back the bottom bead 18a to its original position to the base of the frame 12 and move back the last two beads 20a on the upper section 26 to their original position to the top base of the frame 12. The result as represented by the remaining beads is four (4) as displayed in the middle section 8.

Figure 11:
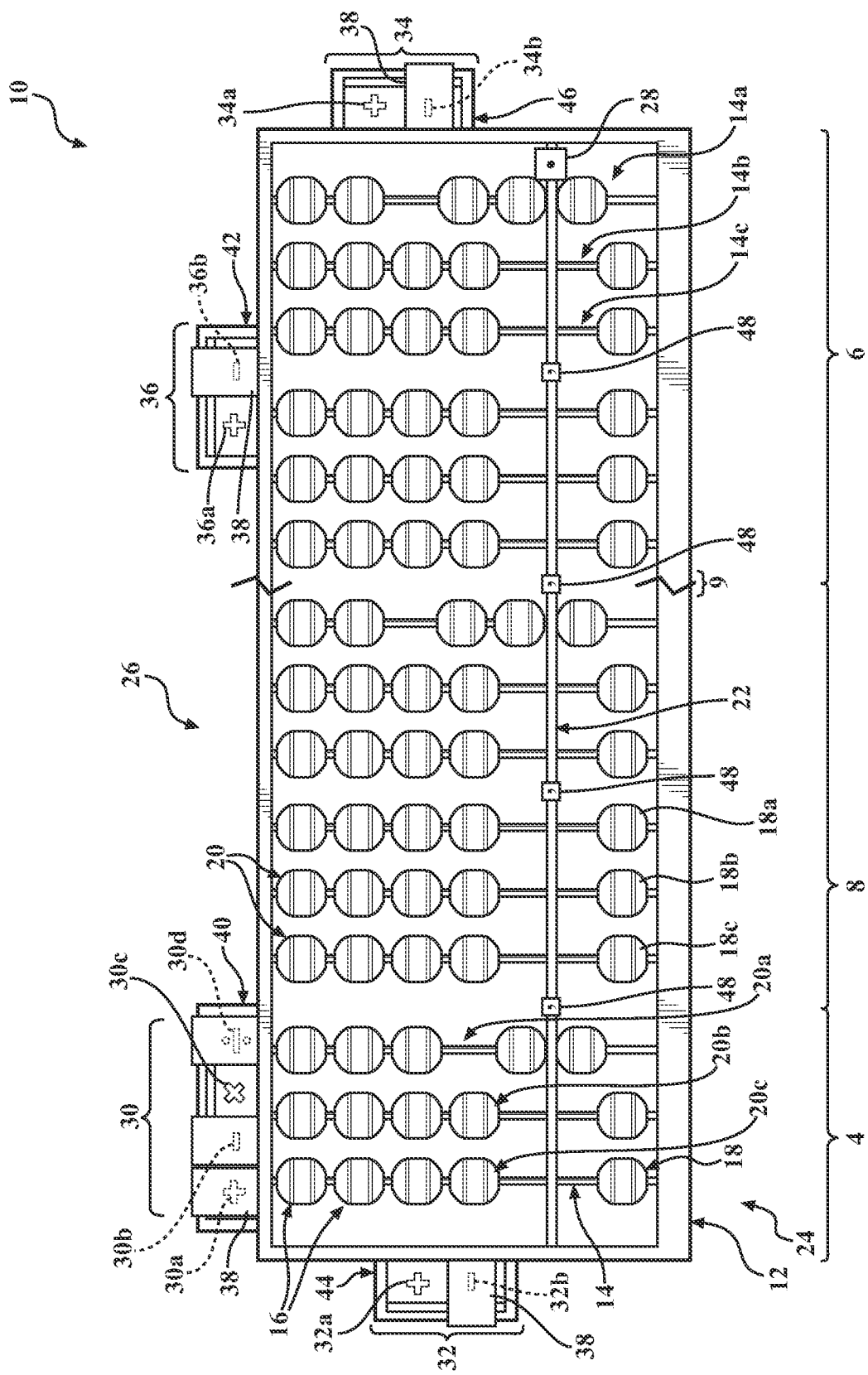
FIG. 11 shows another example of a mathematical operation using the beads of the improved abacus in accordance with a nonlimiting embodiment of the invention and depicting the steps used in the multiplication of the numbers 3 and 5.

With added reference to FIGS. 11 to 15, simple and more complicated multiplication calculations are described. FIG. 11 illustrates the multiplication of a simple number. To multiply the numbers three (3) and five (5), first, assign the multiplication operation sign 30c on the upper left side corner 40 of the abacus 10. Second, set the number three (3) as shown in FIG. 11 by beginning with the beads on the rods in the left section 4 of the abacus 10 and moving the lower bead 18a to the bar 22 and by moving one bead 20a in the upper section 26 down to the bar 22. Next, to set the number five (5), move up the lower bead 18a to the bar 22 and move two beads 20 in the upper section 26 down to the bar 22 in the right section 6 of the abacus 10. To reach the result, copy the position of the beads of the second number five (5) in the middle section 8 of the abacus and duplicate the first number (3) by the value of the bead's position in the second number and assign the bead in the middle section the value of the calculated numbers, (3×1), (3×2) and (3×2). Lastly, adding the final value of the duplicated numbers 3+6+6=15.

Alternatively, the result can be calculated and shown in the middle section 8 of the improved abacus 10 instead of assigning the beads in the middle section 8 a value based on one of the numbers in the calculation. Showing the calculated result in the middle section 8 of the improved abacus 10 can be done by an iterative process of duplicating the value of the first number by the value of the bead's position in the second number or vice versa and moving the beads in the middle section 8 of the abacus 10 based on the result of each duplicated number and then adding the next duplicated number to the numbers already calculated until reaching the fubak result. Lastly, the final calculated value of the moved beads in the middle section of the abacus is read as the result of the calculation. For example, 3×5=((3×1)=3)+ ((3×2)=6)+ ((3×2)=6)=15. The result of this example will be shown in the middle section of the abacus equaling fifteen (15). Since the first column has 5 beads equaling 9, receiving a number above 9 after some of the calculation requires clearing up the beads on the first column 14a in the middle section 8 and moving the beads on the next column from the left of the first column 14a in the middle section 8 depending on the number of the calculation. Thus, the result value of number 15 would require moving the lower bead 18b on the ten's bar 14b up to the bar 22 and moving down two upper beads 20a on the one's rod 14a to the bar 22 and moving the lower bead 18a on the one's bar 14a to the bar 22. This same alternative method, and nonlimiting embodiment of the invention, can be used for all multiplication and division operations on the improved abacus 10.

It should be appreciated that operations on the improved abacus can, and advantageously should be performed on a mentally imaged copy of the abacus. However, it requires more than mental steps to accomplish the result because it is not natural to carry a mental image of the improved abacus in the user's head. It is only with prolonged training and use of the teachings explained herein that an experienced operator of the improved abacus can perform the operations as mental steps aided with a mentally derived image of the improved abacus.

Figure 12:
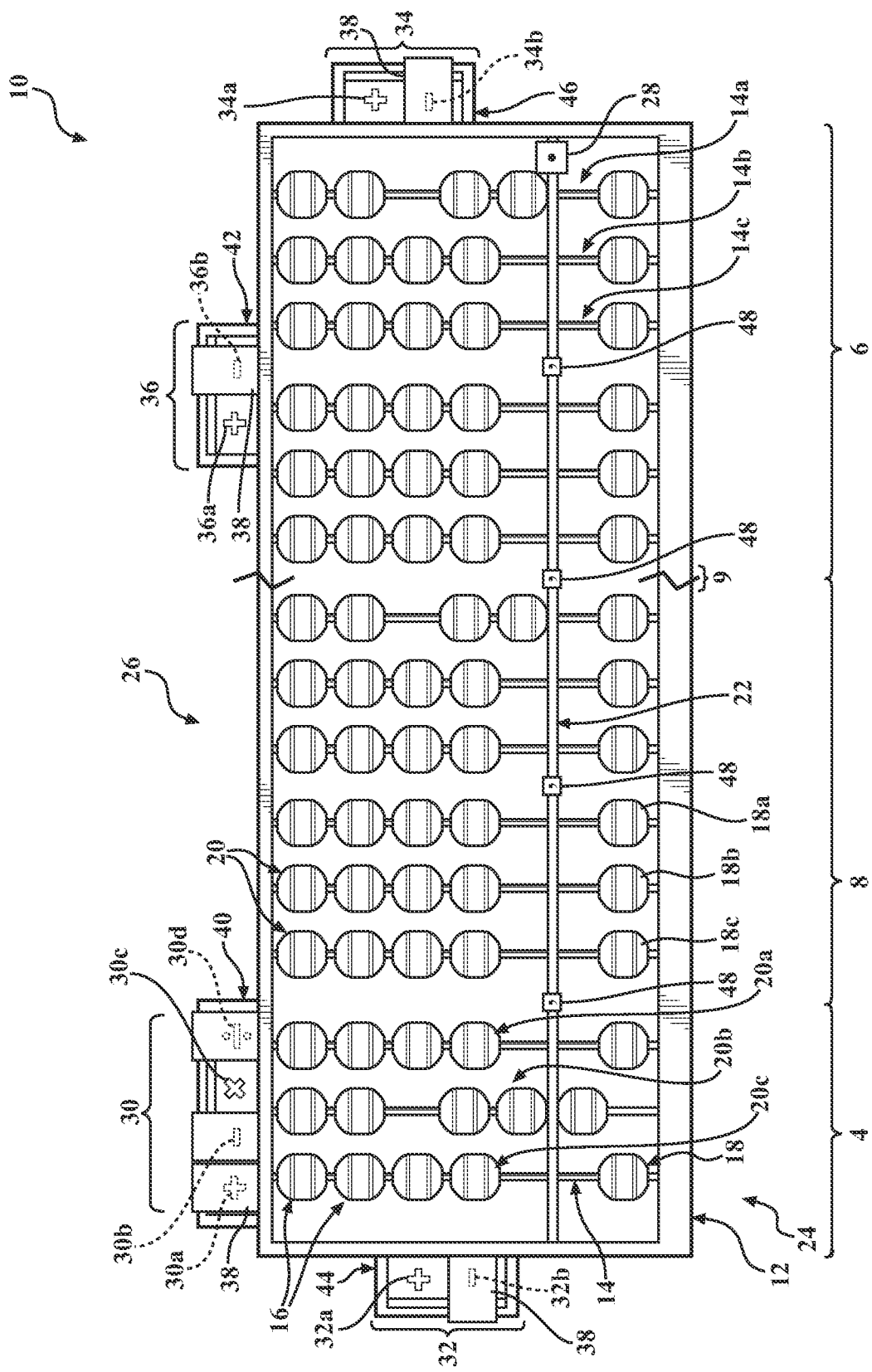
FIG. 12 shows another example of a mathematical operation using the beads of the improved abacus in accordance with a nonlimiting embodiment of the invention and depicting the steps used in the multiplication of the numbers 50 and 4.

With emphasis on FIG. 12, is another example of multiplication. To multiply the numbers fifty (50) and four (4), first, assign the multiplication operation sign 30c on the upper left side corner 40 of the abacus 10. Second, set number fifty (50) by beginning with the beads on the rods positioned on the left section 4 of the abacus 10 and moving two upper beads 20b on the ten's rod 14a to the bar 22 and moving the lower bead 18b on the ten's rods 14a to the bar 22. The beads on the one's rod are unmoved since it is a zero. Third, set the second number four (4) by move two beads 20a in the upper section 26 down to the bar 22 in the right section 6 of the abacus 10. To reach the result, copy the positions of the beads of the second number (4) in the middle section 8 and duplicate the first number fifty (50) by the value of the beads position in the second number and assign the numbers, (50×2), (50×2), and then add the final numbers 100+100=200.

Figure 13:
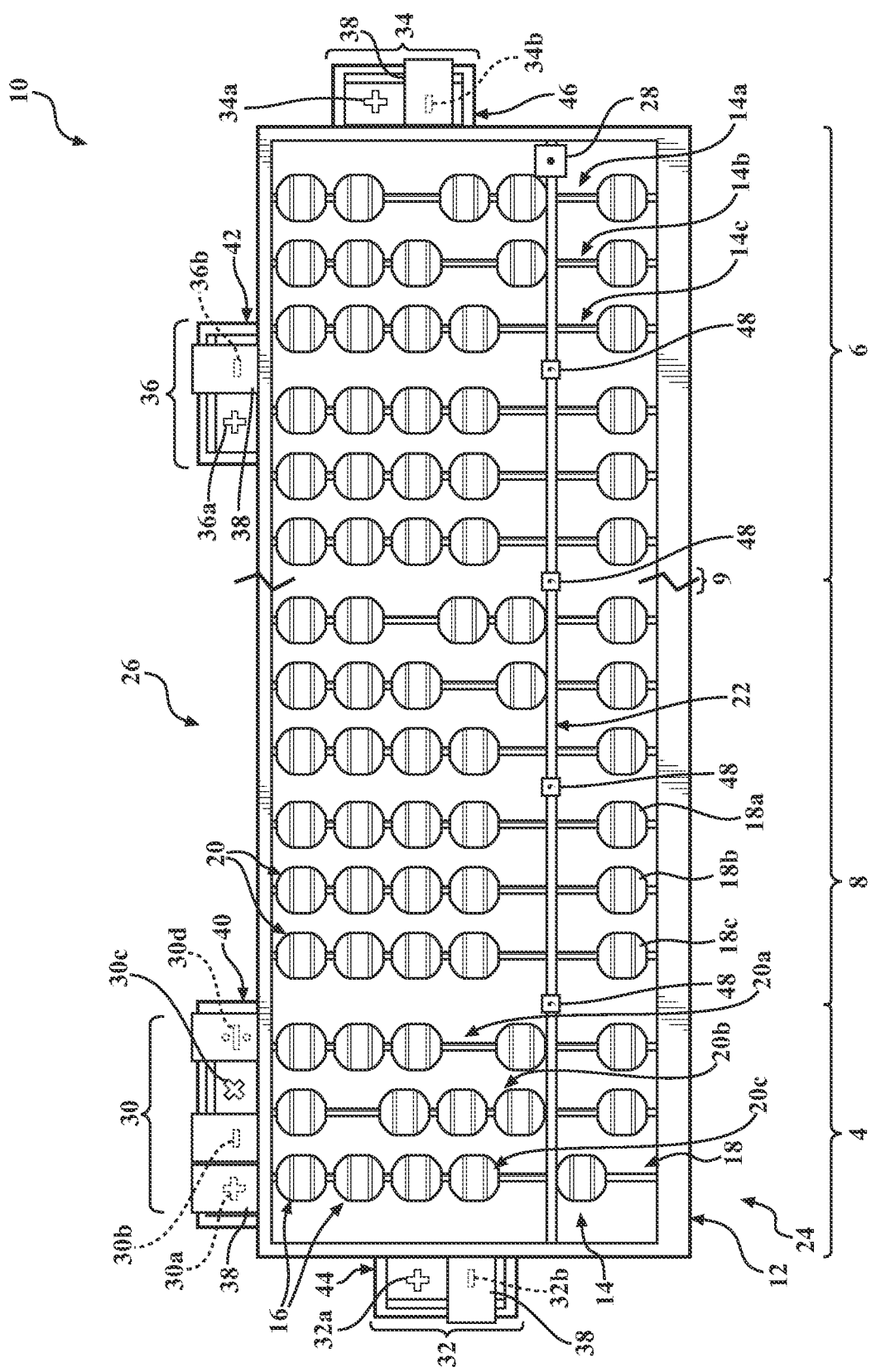
FIG. 13 shows another example of a mathematical operation using the beads of the improved abacus in accordance with a nonlimiting embodiment of the invention and depicting the steps used in the multiplication of the numbers 162 and 24.

With emphasis on FIG. 13, the multiplication of a complicated number is described. To multiply the numbers one hundred sixty-two (162) and twenty-four (24), first, assign the multiplication operation sign 30c on the upper left side corner 40 of the abacus 10. Second, set the number one hundred sixty-two (162) by beginning with the beads on the rods in the left section 4 of the abacus and marking the one's rod with the unit indicator 28 on the bar. Move the upper bead 20a to the bar 22 on the one's rod 14a that is indicated by the unit indicator 28 and move three beads 20b on the upper section 26 on the ten's rod 14b towards to the bar 22 and move up the lower bar 18c on the hundred's rod 14c to the bar 22. For the number 24, begin with the rods on the right section 6 of the abacus 10 and set it by moving one bead 20b in the upper section of the ten's rod 14b towards to the bar 22 and two beads 20a in the upper section 26 of the one's rod 14a towards the bar. To reach the result, copy the positions of the beads of the second number twenty-four (24) in the middle section 8 of the abacus 10 and duplicate the number one hundred sixty-two (162) by the original values of the beads, (162×20), (162×2) and (162×2) then add the final results 3240+324+324=3888.

Figure 14A:
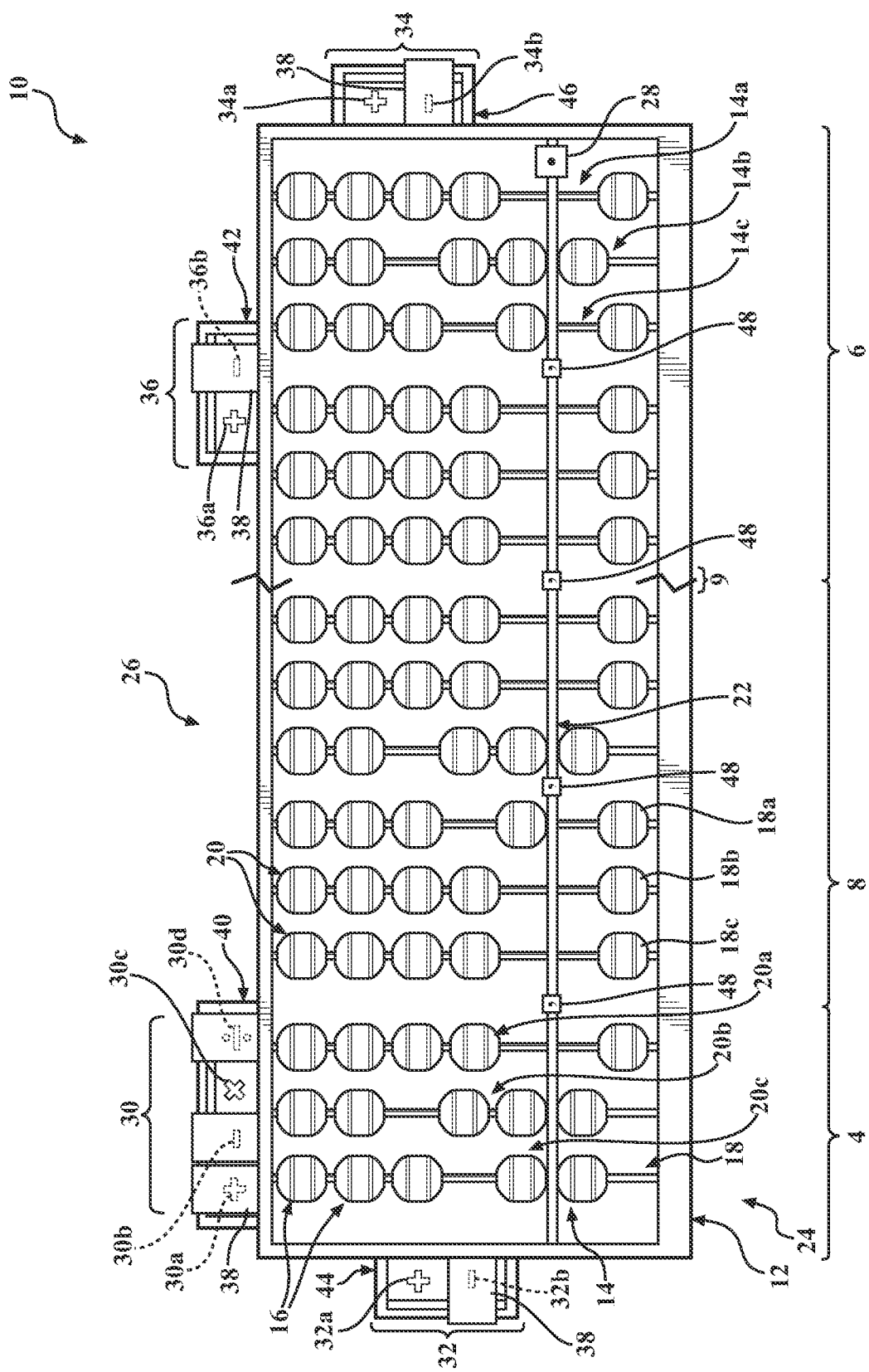
FIG. 14A shows another example of a mathematical operation using the beads of the improved abacus in accordance with a nonlimiting embodiment of the invention and depicting the steps used in the multiplication of the numbers 350 and 250.

With emphasis on FIG. 14A, the multiplication of a complicated number is described. To multiply the numbers three hundred fifty (350) and two hundred fifty (250), first, assign the multiplication operation sign 30c on the upper left side corner 40 of the abacus 10. Second set the number three hundred fifty (350) by beginning with the beads on the rods in the left section 4 of the abacus 10. Move two upper beads 20c on the hundred's rod 14c to the bar 22, and move the lower bead 18c on the hundred's rod 14c to the bar 22, and two upper beads 20b on the ten's rod 14b to the bar 22 and the lower bead 18b on the ten's rod 14b to the bar 22. No beads are to be moved on the one's rod since it is a zero. For the number two hundred fifty (250), begin with the column on the right section 6 of the abacus 10 and set it by moving two upper beads 20c on the hundred's rod 14c, move two upper beads 20b on the ten's rod 14b to the bar 22 and move the lower bead 18b on the ten's rod 14b to the bar 22. No beads are to be moved in the one's rod since it is a zero. To reach the result, copy the position of the beads of the second number two hundred fifty (250) in to the middle section 8 of the abacus by first marking the unit indicator 28 for the position of the digits, then duplicate the second number three hundred fifty (350) by the original values of the beads that are based on the position of two hundred fifty (250) in the middle section starting from the hundred's rod and moving right to the one' rod, (350×200)+ (350×100)+ (350×20)+ (350×20). Lastly, add the final numbers 70,000+7,000+7,000+3,500=87,200.

Figure 14B:
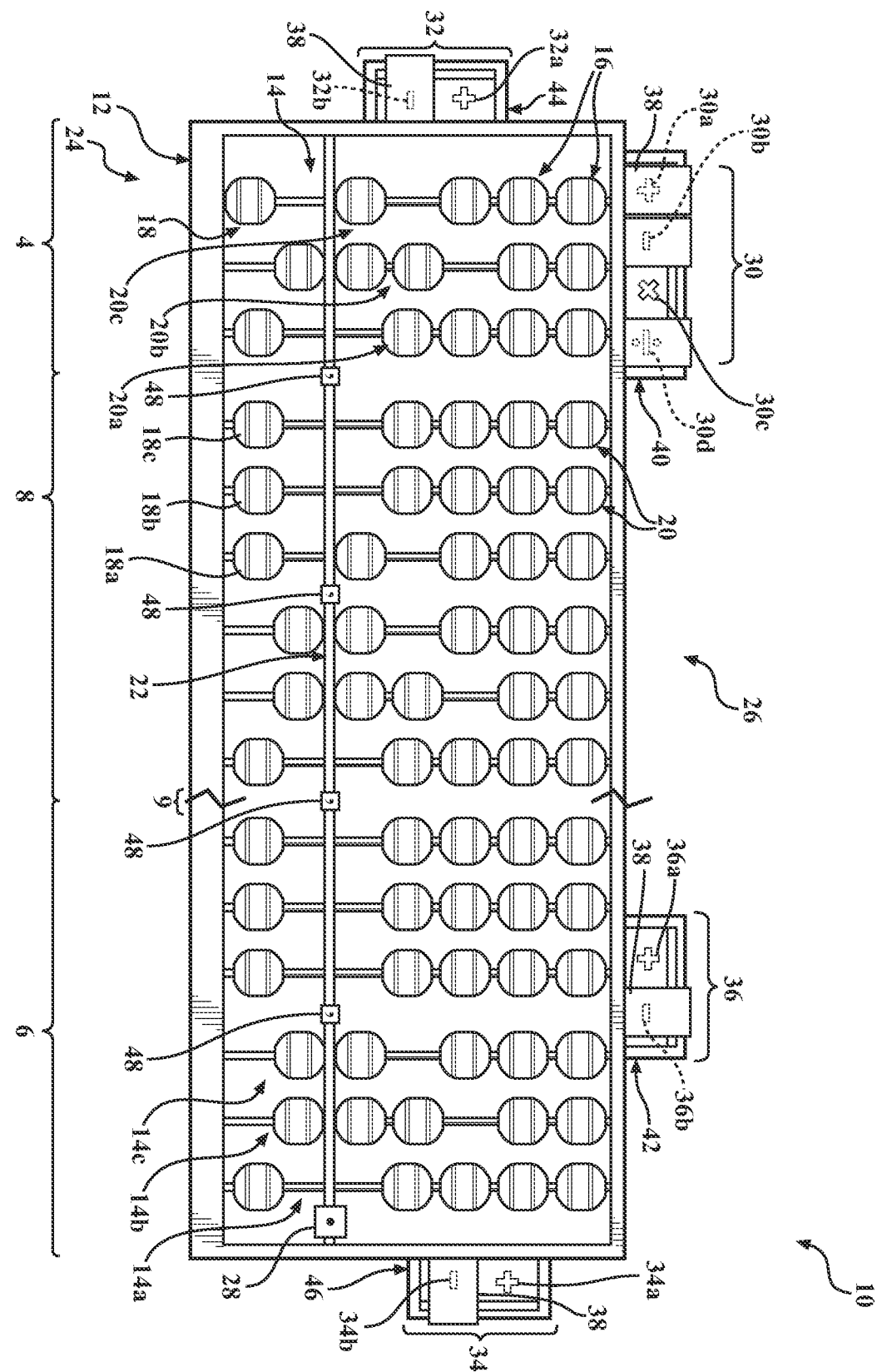
FIG. 14B shows another example of a mathematical operation using the beads of the improved abacus in accordance with a nonlimiting embodiment of the invention and depicting the steps used in the multiplication of the numbers 250 and 350.

Referring to FIG. 14B, the multiplication of a complicated number is described. To multiply the numbers three hundred fifty (350) and two hundred fifty (250), first, assign the multiplication operation sign 30c on the upper left side corner 40 of the abacus 10. Second, set the first number three hundred fifty (350) by beginning with the beads on the rods in the left section. Move two upper bead 20c on the hundred's rod 14c to the bar 22 and move the lower bead 18c on the hundred's rod 14c to the bar 22. Next, move two upper beads 20b on the ten's rod 14b to the bar 22 and the lower bead 18b on the ten's rod 14b to the bar 22. No beads are to be moved on the one's rod since it is zero. For the number two hundred fifty (250), begin with the column on the right side 6 of the abacus 10 and set the second number by moving two upper beads 20c on the hundred's rod 14c, move two upper beads 20b on the ten's rod 14b to the bar 22 and move the lower bead 18b on the ten's rod 14b to the bar 22. No beads are to be moved on the one's rod since it is zero. To reach the result, copy the position of the beads of the first number three hundred fifty (350) because the second number is easier to add after duplication. Therefore, first copy the position of the beads of the firm number three hundred fifty (350) in to the middle section 8 of the abacus 10 by first marking the unit indicator 28 for the position of the one's digit, then duplicate second number two hundred fifty (250) by the original values of the beads that are based on the positions of first number three hundred fifty (350) in the middle section 8 starting from the hundred's rod and moving right to the one's rode, (250×200)+ (250×100)+ (250×20)+ (250×20)+ (250×20)+ (250×10). Lastly, add the final numbers 50,000+25,000+5,000+2,500=87,200.

Figure 15:
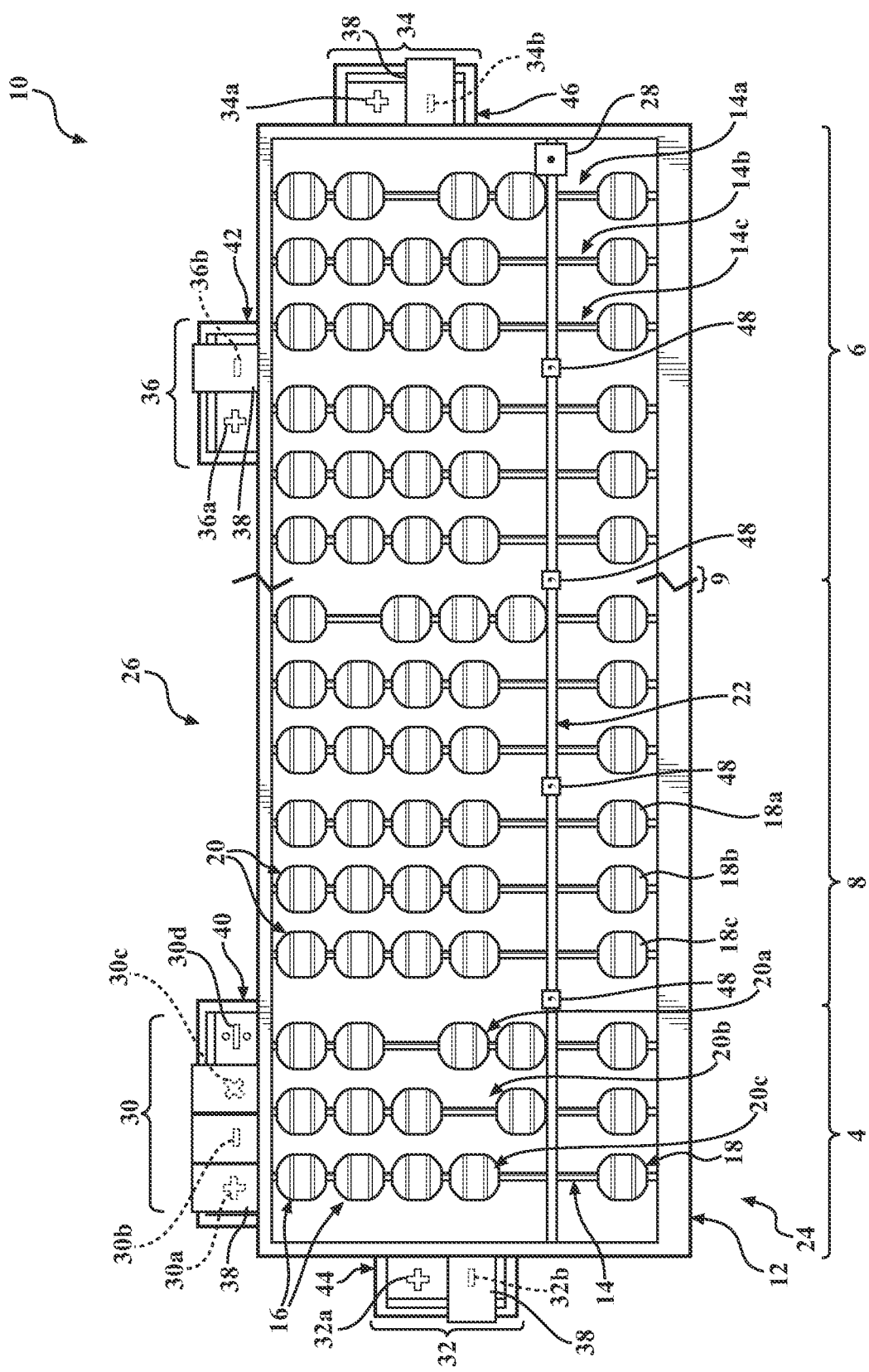
FIG. 15 shows another example of a mathematical operation using the beads of the improved abacus in accordance with a nonlimiting embodiment of the invention and depicting the steps used in the division of the numbers 24 and 4.

Now with emphasis on FIG. 15, the division of a simple number is described. To divide the number twenty-four (24) with four (4). First, assign the division operation sign 30d on the upper left side corner 40 of the abacus 10. Second, set the number twenty-four (24) in the left section of the abacus 10. Move the upper bead 20b on the ten's rod 14b to the bar 22 and move two beads 20a on the one's rod 14a to the bar 22. For number four (4), in the right section 6 of the abacus 10, move two beads 20a on the one's rod 14a towards the bar 22. In the middle section 8 of the abacus 10, begin with the beads 20a on the one's rod 14a on the upper section 26 of the abacus 10 since the operation involves dividing by an even number meaning the result should be even. Duplicate the second number four (4) by the value of the upper bead 20a on the one's rod 14a and continue duplicating 4×2 on the one's rod until the result equals twenty-four (24) is reached. Therefore, it is (4×2)+ (4×2)+ (4×2)=(8+8+8)=24. The result is to be read by the resultant position of the beads in its original value on the rod, which equals number six (6). This approach is used when dividing by a single digit.

Figure 16:
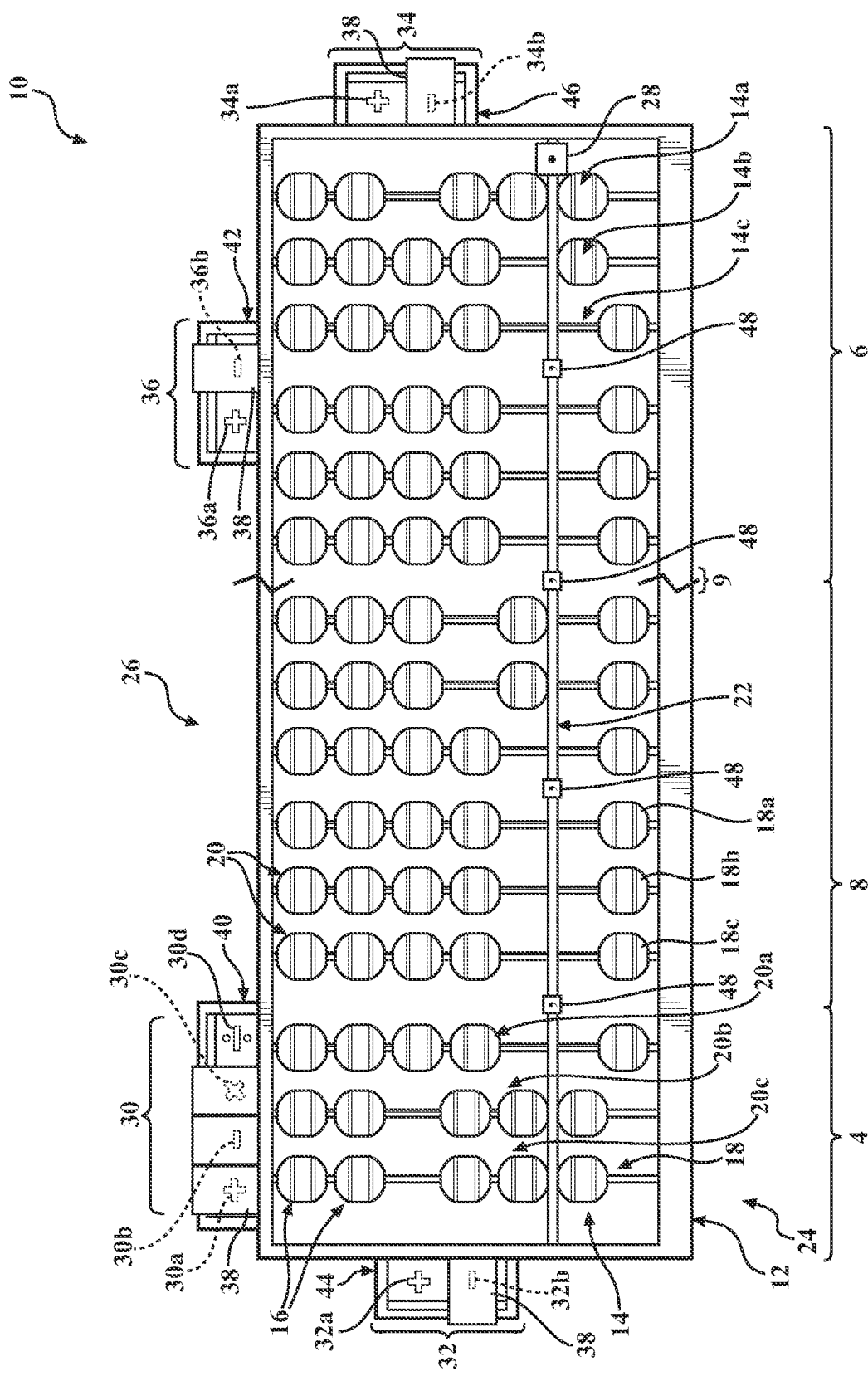
FIG. 16 shows another example of a mathematical operation using the beads of the improved abacus in accordance with a nonlimiting embodiment of the invention and depicting the steps used in the division of the numbers 550 and 25.

With emphasis on FIG. 16, the division of a more complex number is described. To divide the number five hundred fifty (550) by twenty-five (25) first, assign the division operation sign 30d on the upper left side corner 40 of the abacus 10. Second set the first number five hundred fifty (550) in the left section 4 of the abacus 10, by moving the upper bead 20c on the hundred's rod 14c to the bar 22 and move two beads 20b on the ten's rod 14b to the bar 22 and the lower bead 18b on the ten's rod 14b to the bar 22. Lastly, no beads are to be moved on the one's rod 14a since it is zero. For the second number twenty-five (25), in the right section 6 of the abacus 10, move one bead 20b on the ten's rod 14b towards the bar 22, move two upper beads 20a on the one's rod 14a to the bar 22 and a lower bead 18a on the one's rod 14a to the bar 22. Move the unit indicator 28 to the middle section 8 of the abacus and assign the digits of the divisor. Begin with duplicating the divisor by the value of the beads 20a in the ten's rod 14b, which is 20. Therefore, 25×20=500. Since the duplicated result is close to the value of the dividend, move right to the one's rod and duplicate the devisor by the value of the beads 20 on the one's rod 14a until reaching the result (25×2)=50. Lastly, read the result by the original value of the beads as positioned on the rods in the middle section of the abacus, which equals number twenty-two (22).

Figure 17:
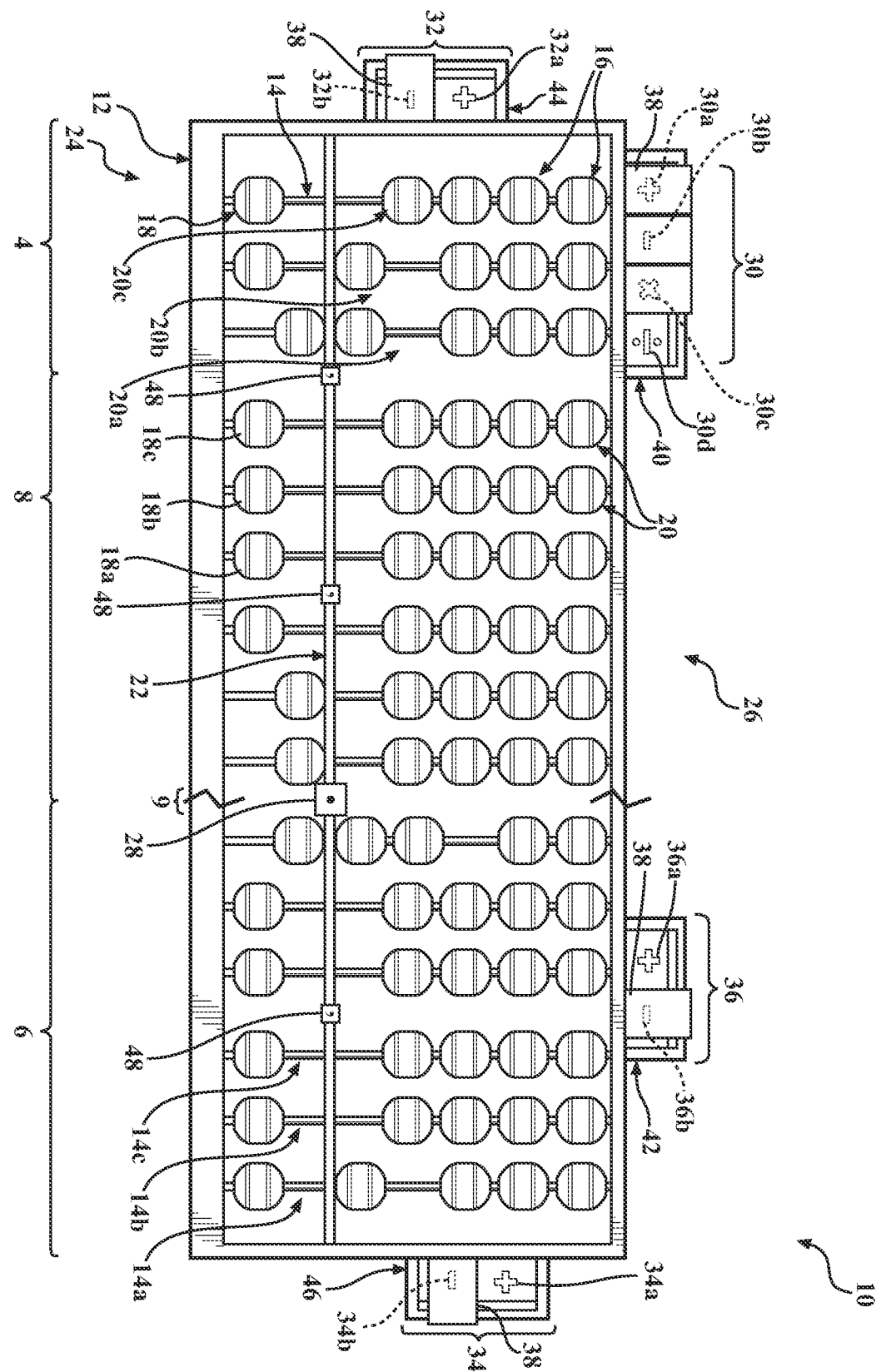
FIG. 17 shows another example of a mathematical operation using the beads of the improved abacus in accordance with a nonlimiting embodiment of the invention and depicting the steps used in the division of the numbers 23 and 2.

Now with emphasis on FIG. 17, the division of a more complex number is described. To divide the number twenty-three (23) by two (2). First, assign the division operation sign 30d on the upper left side corner 40 of the abacus 10. Second, set the first number twenty-three (23) in the left section 4 of the abacus 10. Move the upper bead 20b on the ten's rod 14b to the bar 22 and move two beads 20a on the one's rod 14b to the bar 22 and the lower bead 18a on the one's rod 14a to the bar 22. For the second number two (2), set it in the right section 6 of the abacus 10 by moving the upper bead 20a on the one's rod 14a towards the bar 22. Move the unit indicator 28 to the middle section 8 of the abacus 10 and assign the digits of the divisor. Begin with duplicating the divisor by the value of the beads 20a on the one's rod 14a, which is the number 2. Since duplicating the divisor by itself would lead to a result that is far off from the dividend, move the digit indicator to the left of the abacus and duplicate the divisor by the value of the lower bead 18b on the ten's rod 14b, which is 2×10=20. Since duplicating the divisor by the value of the beads 18b results in a number that is close to the dividend, move right to the one's rod and duplicate the divisor by the value of the lower beads 18a on the one's rod 14a. (2×1)=2. If the calculated valve of the duplicated divisor equals the value of the dividend, read the result by the original value of the beads as positioned on the rods in the middle section 8 of the abacus. If there is a reminder, positioned the reminder by a decimal point. Therefore, the result is the number 11 with a reminder of 1.

Figure 18:
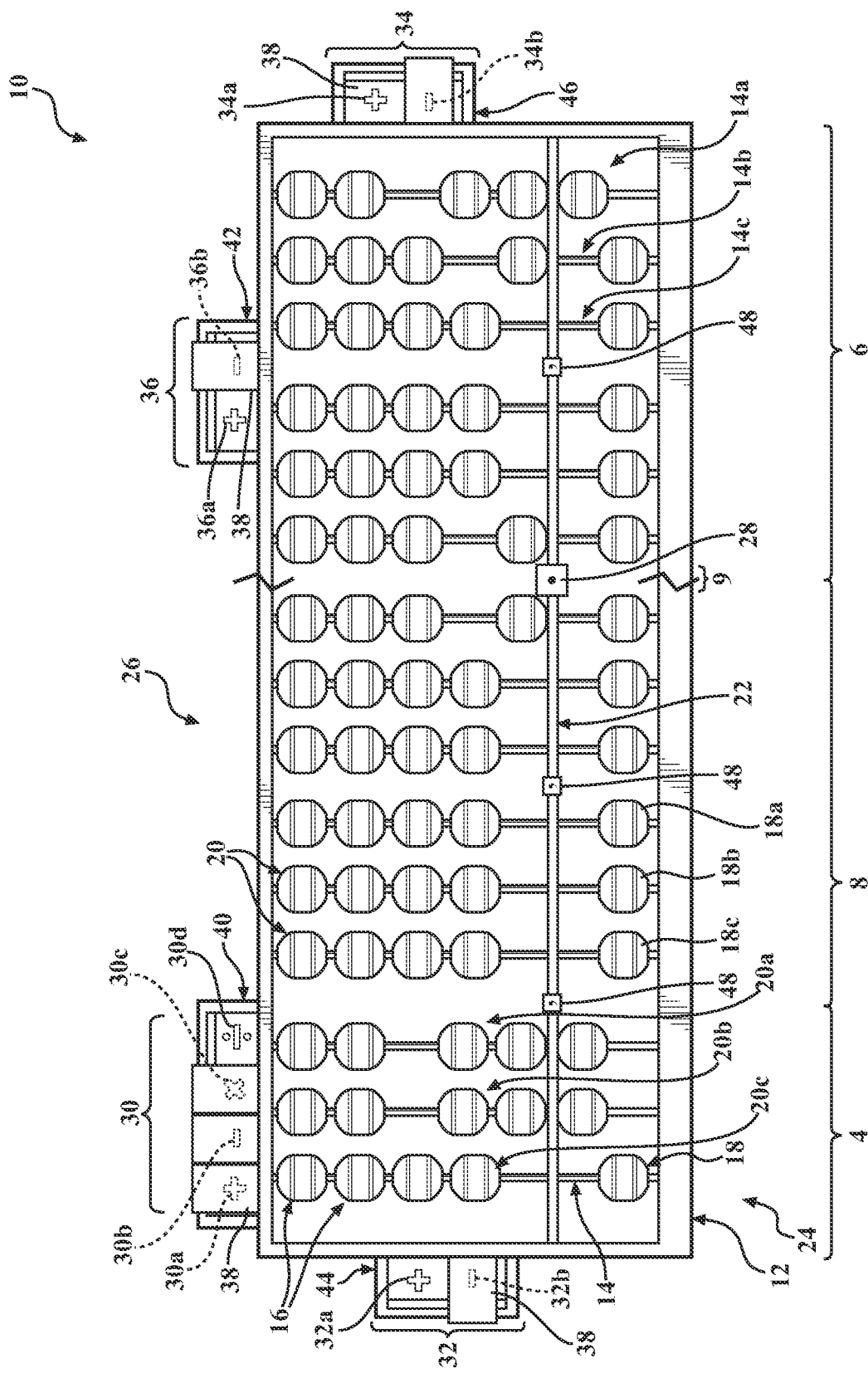
FIG. 18 shows another example of a mathematical operation using the beads of the improved abacus in accordance with a nonlimiting embodiment of the invention and depicting the steps used in the division of the numbers 55 and 25.

With emphasis on FIG. 18, the division of a complex number is described. To divide the number fifty-five (55) by twenty-five (25), first, assign the division operation sign 30d on the upper left side corner 40 of the abacus 10. Second, set the first number fifty (50) in the left section 4 of the abacus 10 by moving two upper beads 20b on the ten's rod 14b to the bar 22 and moving the lower beads 18b on the ten's rod 14b to the bar 22. No beads are to be moved on the one's rod 14a since it is zero. For the second number twenty-five (25), in the right section 6 of the abacus 10, move the upper bead 20b on the ten's rod 14b towards the bar 22. Move two upper beads 20a on the one's rod 14a to the bar 22 and move the lower beads 18a on the one's rod 14a to the bar 22. Move the unit indicator to the middle section 8 of the abacus 10 and assign the digits of the divisor to the result. Begin with duplicating the divisor by the value of the beads 20b on the ten's rod 14b. Since duplicating the divisor by itself would lead to a result that is far bigger from the dividend, move the digit indicator to the right on the abacus and duplicate the divisor by the value of the upper bead 20a on the one's rod 14a, which is 25×2=50. Duplicating the divisor by the value of the lower bead 18a would result after calculating the value of the duplicated divisor in a number that is bigger than the dividend, which is the number 75. Read the result by the original value of the beads as positioned on the rods in the middle section of the abacus and position the reminder by a decimal point. Therefore, the result is the two (2) with a remainder of five (5).

Figure 19:
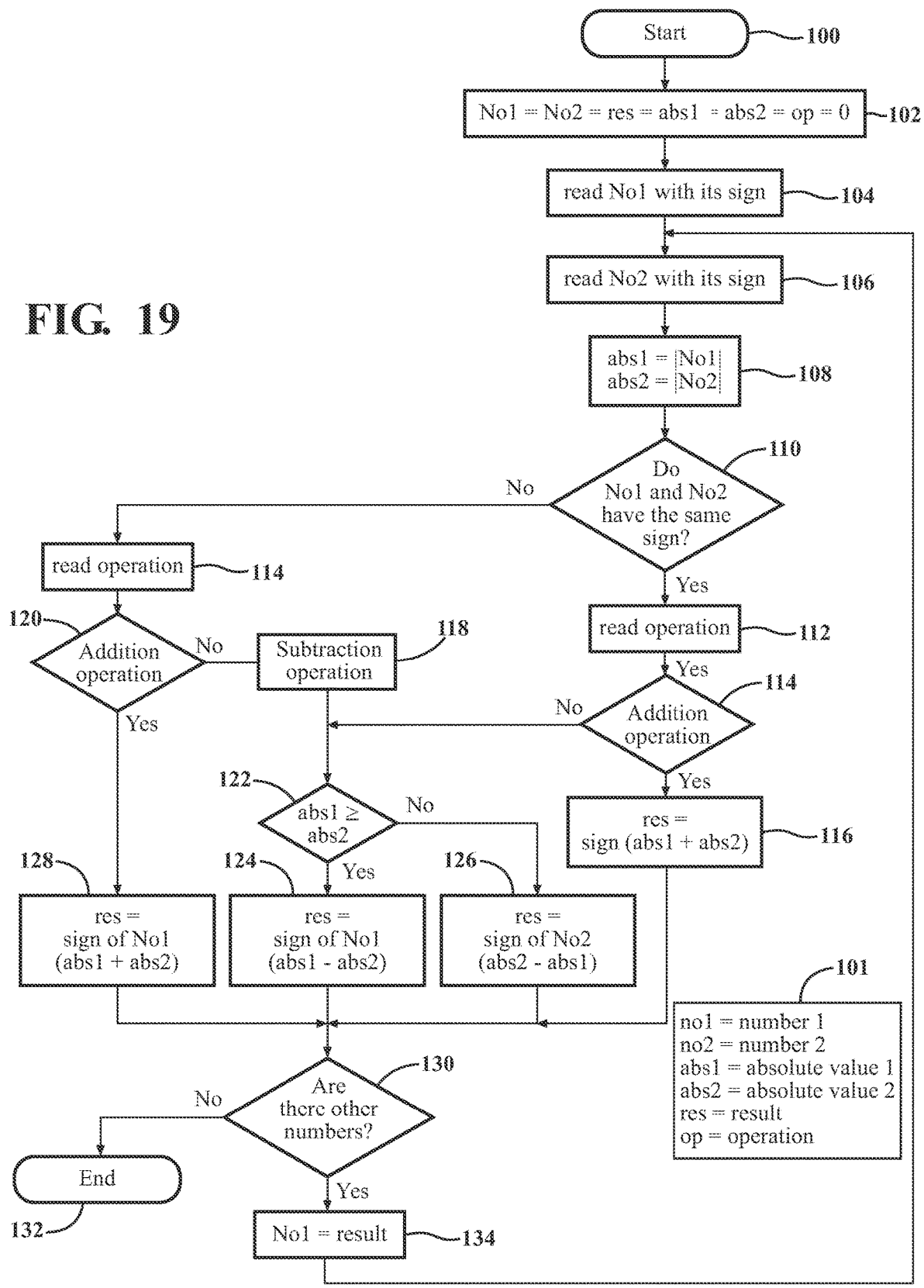
FIG. 19 is a flowchart of the steps of mathematical operations using the beads of the improved abacus in accordance with a nonlimiting embodiment of the invention including in an addition and abstraction operation when two numbers have the same and different signs.

Referring now to FIG. 19 with continuing reference to FIG. 1, the processing steps performed on the abacus 10 in an addition 30a and subtraction 30b operations when two numbers have the same and different signs can be demonstrated. The process starts 100 with reading the numbers 102 and then reading the first number with its positive/negative sign 104 and assigning it its positive/negative sign 34 on the abacus. The next step involves reading the second number with its sign 106 and assigning it its positive/negative sign 32 on the abacus. The next step involves placing the numbers in the absolute value form 108. The next step involves reading whether the first number has the same positive/negative sign as the second number 110. If yes, select the appropriate operation 112. For performing an additional operation 114, select the addition sign 30a from the selector 38 on the abacus and add both numbers together with placing the sign of the result 36 in front of the operation 116.

For performing a subtraction operation 118, determine whether the absolute value of the first number is greater than or equal to the absolute value of the second number 122. If the absolute value of the first number is greater than or equal to the absolute value of the second number, the sign of the result is the sign of the first number 124. If the absolute value of the first number is less than the absolute value of the second number, the sign of the result is the sign of the second number 126. The final step for the numbers that have the same positive/negative sign is determining whether other numbers are remaining in the calculation 130. If yes, the result is assigned as the first number 134 of a next operation and the next operation will proceed with the fourth step 106 from the start 100. If there are no other numbers remaining in the calculation, the operation ends 132.

For numbers that do not have the same positive/negative sign, read the operation of the mathematical calculation 114. For performing a subtraction operation 118, select the subtraction sign 30b from the selector 38 and determine whether the absolute value of the first number is greater than or equal to the absolute value of the second number 122. If the absolute value of the first number is greater than or equal to the absolute value of the second number, the sign of the result is the sign of the first number 124. If the absolute value of the first number is less than the absolute value of the second number, the positive/negative sign of the result is the sign of the second number 126. For performing an additional operation 120, select the addition sign 30a from the selector 38 on the abacus, and the result will be the sign of the first number 128. The final step for the numbers that have different positive/negative signs is determining whether other numbers are remaining in the calculation 130. If yes, the result is assigned as the first number 134 of a next operation, and the next operation will proceed with the fourth step 106 from the start 100. If there are no other numbers remaining in the calculation, the operation ends 132.

Figure 20:
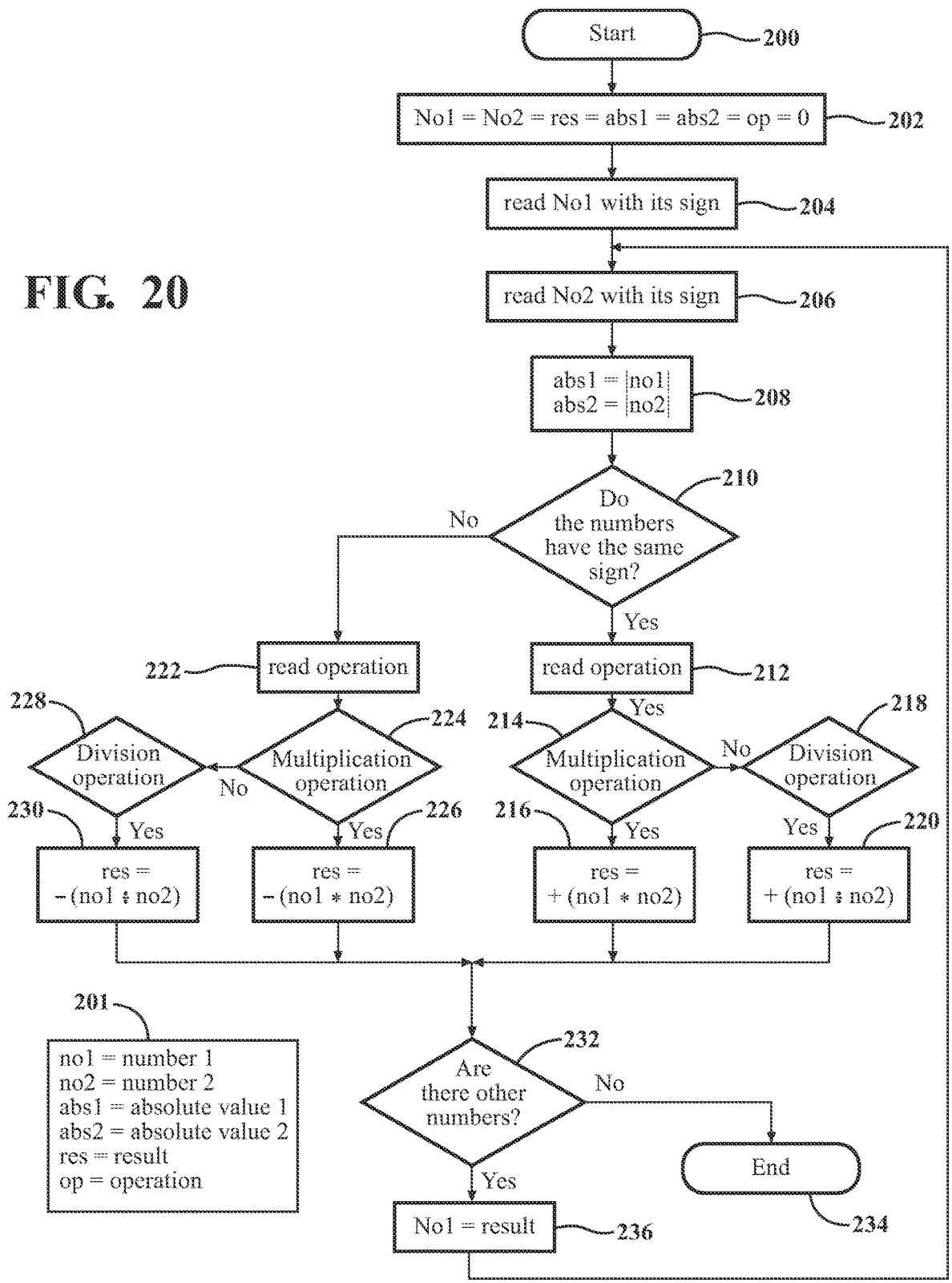
FIG. 20 is a flowchart of the steps of mathematical operations using the beads of the improved abacus in accordance with a nonlimiting embodiment of the invention including multiplication and division operations when two numbers have the same and different signs.

Referring now to FIG. 20 with continuing reference to FIG. 1, the processing steps performed on the abacus 10 in multiplication and division operations when two numbers have the same and different positive/negative signs will be described.

The process starts 200 with reading the numbers 202 and then reading the first number with its positive/negative sign 204 and assigning it its positive/negative sign 34 on the abacus. The next step involves reading the second number with its positive/negative sign 206 and assigning it its positive/negative sign 32 on the abacus. The next step involves placing the numbers in their absolute value form 208. The next step involves reading whether the first number has the same positive/negative sign as the second number 210. If yes, read the operation 212 and select the appropriate operation sign 30 on the abacus. For performing a multiplication operation 214, select the appropriate sign 30c from the selector 38 on the abacus, calculate the numbers together, and place the positive sign on the result 216. For performing a division operation 218, select the appropriate sign 30*d* from the selector on the abacus, calculate the numbers together, and place the positive sign on the result 220.

For numbers that do not have the same positive/negative sign, read the operation 222 of the mathematical calculation 30 on the abacus. For performing a multiplication operation 224, select the appropriate sign 30*c* from the selector on the abacus, calculate the numbers together, and place the negative sign on the result 226. For performing a division operation 228, select the appropriate sign 30*d* from the selector on the abacus, calculate the numbers together, and place the negative sign on the result 230.

The final step for the numbers that have the same and different positive/negative signs is determining whether there are other numbers remaining in the calculation 232. If yes, the result is assigned as the first number 236 of a next operation and the next operation will proceed with the fourth step 206 from the start 200. If there are no other numbers remaining in the calculation, the operation ends 234.

Figure 21:
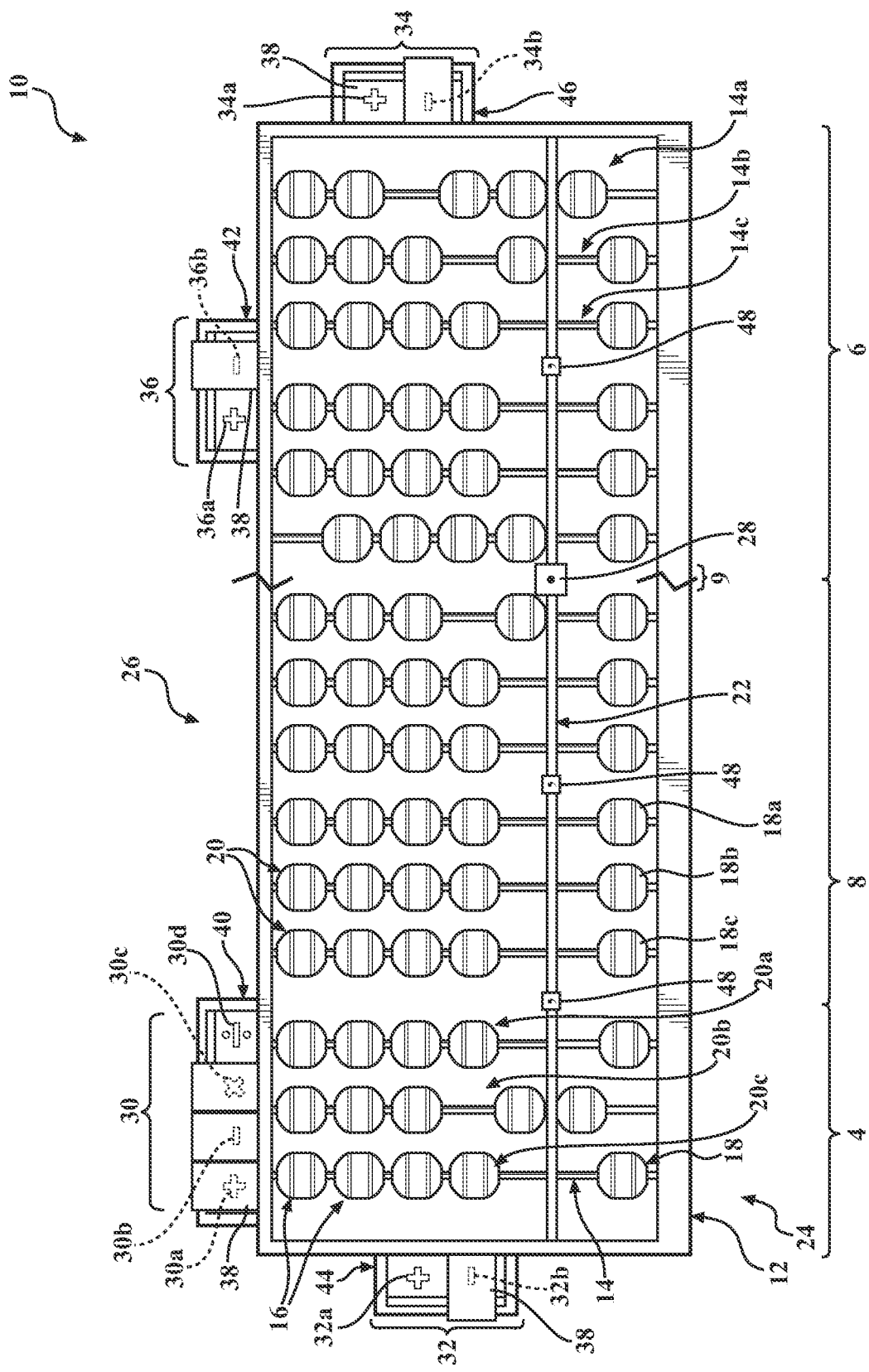
FIG. 21 shows another example of a mathematical operation using the beads of the improved abacus in accordance with a nonlimiting embodiment of the invention and depicting the steps used in finding the simplest version of fractions.

Referring now to FIG. 21, finding the simplest version of a fraction of the numbers twenty-four (24) and thirty (30) are demonstrated. Since the nominator and the dominator are even numbers, divide both numbers by two (2) to reduce them to the numbers twelve (12) and fifteen (15). That shows that the nominator is an even number, and the dominator is an odd number with its one's digit beginning with the number five (5), meaning that fifteen (15) is dividable by five (5). Dividing fifteen (15) by five (5) would give the result of three (3). Therefore, to reduce the number of the numerator or the denominator further, divide both numbers by three (3) to obtain the prime number for the numerator or the denominator that is no longer possible to simplify anymore. The method used of knowing that the number can be divided by three (3) is by the addition of the digits of the number is to show that can divided by three (3) such as adding the digits of the number twelve (12) together as 1+2=3, thus it can be divided by three (3) to simplify further the numbers.

Figure 22A:
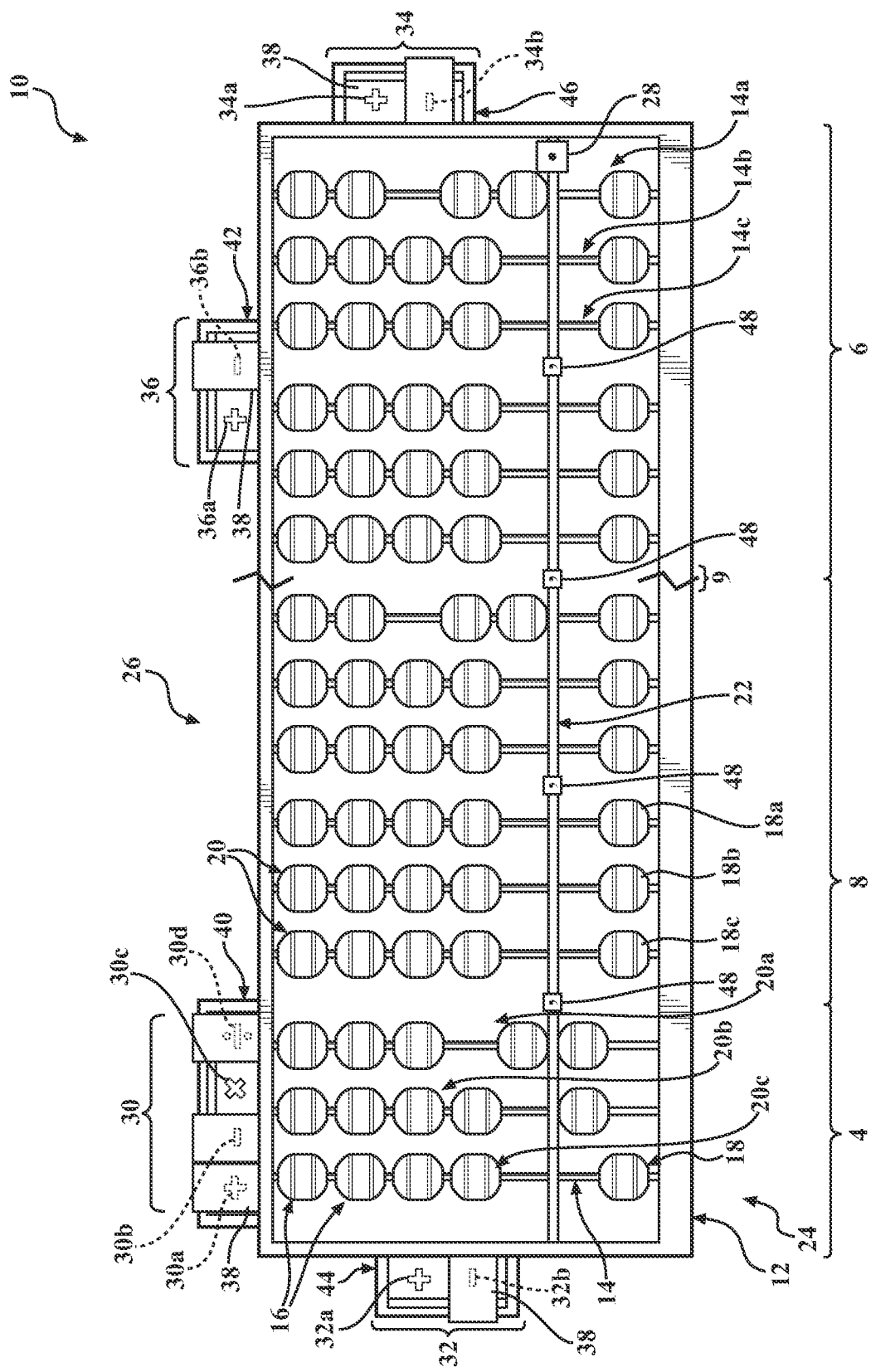
FIG. 22A shows another example of a mathematical operation using the beads of the improved abacus in accordance with a nonlimiting embodiment of the invention and depicting the steps used in simplifying fractions into decimals.
Figure 22B:
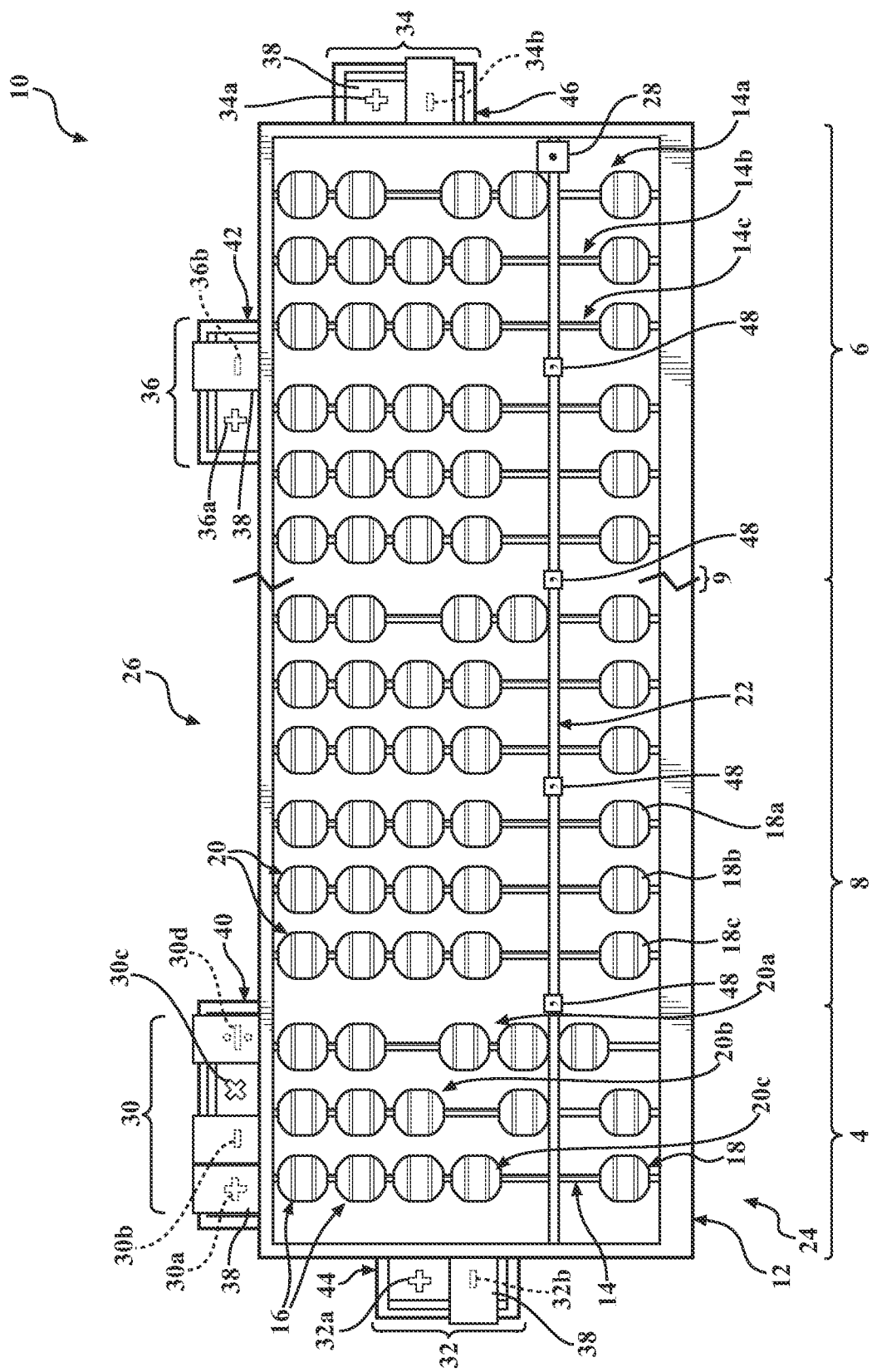
FIG. 22B shows another example of a mathematical operation using the beads of the improved abacus in accordance with a nonlimiting embodiment of the invention and depicting the steps used in simplifying fractions into decimals.
Figure 22C:
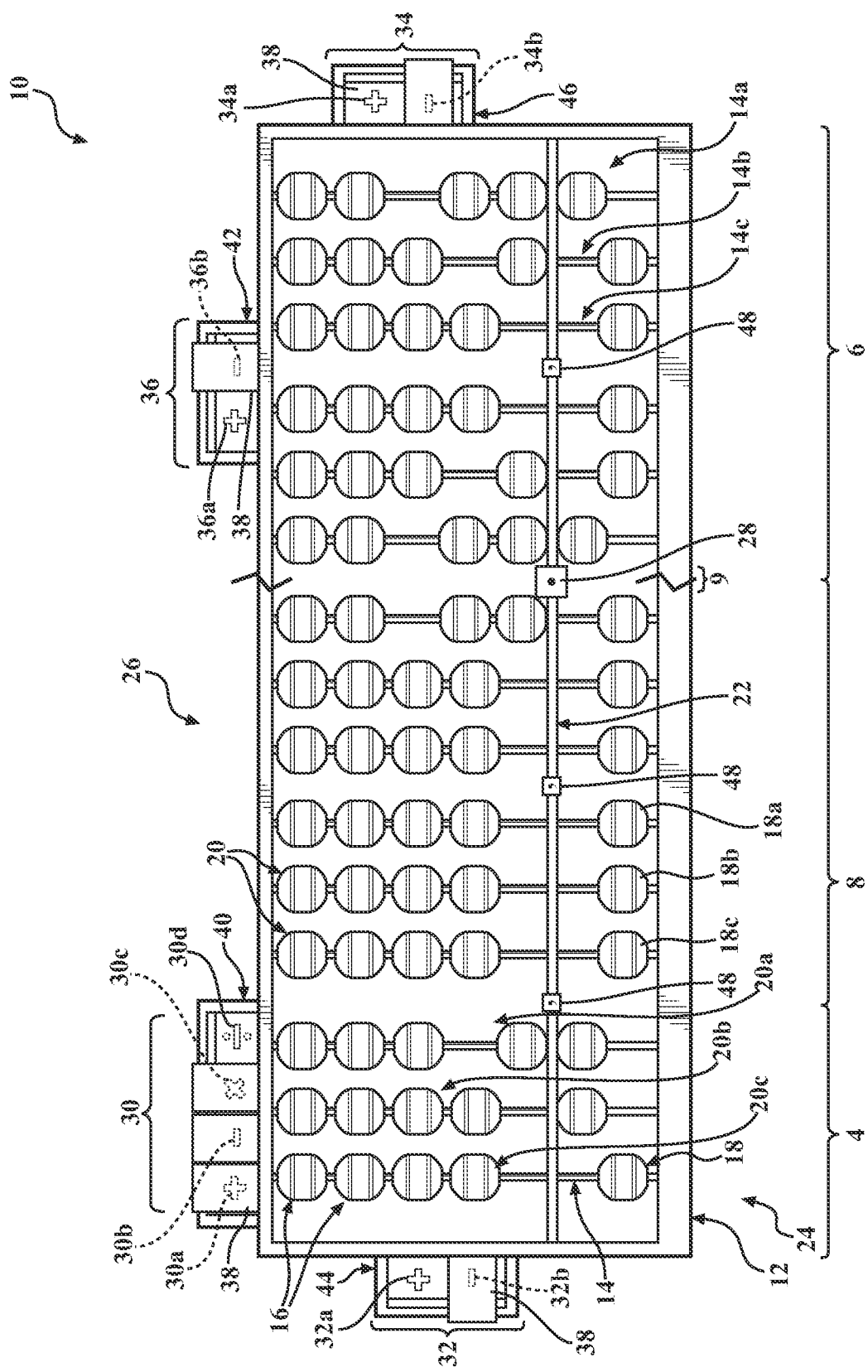
FIG. 22C shows another example of a mathematical operation using the beads of the improved abacus in accordance with a nonlimiting embodiment of the invention and depicting the steps used in simplifying fractions into decimals.

Referring now to FIGS. 22A to 22C, demonstration of simplifying a fraction into a decimal is shown. For a multiplication or division operation, when a denominator is a number that can be multiplied by another number to become 10 or its multiples, the numerator is multiplied by that number. Therefore, since it is known that 100 is the 4th factor of 25, convert the fraction 13/25 to a decimal fraction by multiplying the nominator thirteen (13) by four (4) and the denominator twenty-five (25) by four (4). The result being 52/100, which is 0.52 in decimals. FIG. 22A demonstrates multiplying the nominator thirteen (13) by four (4) equaling 52. FIG. 22B demonstrates multiplying the denominator twenty-five (25) by four (4) equaling 100. FIG. 22C demonstrates resolving the fraction 13/25 into a decimal 0.52.

Therefore, a student or accomplished user can use the improved abacus 10 and associated improved calculating methods to make both simple and complex mathematical calculations. The above examples and nonlimiting embodiments are intended to help explain how to use the abacus but are not meant as a limitation on its form or use. There are an unlimited number of variations of calculations that can be performed on the improved abacus and by using the improved method. What is common among all calculation methods using the improved abacus is the ability to more easily represent the numbers being operated upon and the result of the operation. The improved abacus 10 and method are not only an improvement in the function and type of an abacus but also will make learning fun while offering educational benefits unavailable with other current methods of teaching mathematics. Accomplished users will have a lifelong tool in a physical or mental form that allows for more easily understanding and resolving mathematical calculations.

What is claimed is:

1. An improved abacus for use by an individual to make mathematical calculations, the improved abacus comprising:
a frame;
a plurality of vertical rods positioned parallel to each other across the frame, wherein each vertical rod represents a column of numbers;
a plurality of movable beads positioned on each rod, wherein the beads are divided into two unequal sections by a horizontal bar that is perpendicular to the rods, and
a mathematical operation indicator disposed in the frame, wherein the mathematical operation indicator is adapted to expose and cover more than one mathematical operation sign.

2. The improved abacus of claim 1, wherein the mathematical operation sign includes at least two signs from the group consisting of a plus sign, a negative sign, a multiplication sign and a division sign.

3. The improved abacus of claim 1, further comprising a comma positioned after every third rod on the horizontal bar, wherein the comma allows easier organization of the numbers.

4. The improved abacus of claim 1, wherein the plurality of vertical rods form a right section, a middle section, and a left section of the frame, wherein mathematical calculations with the beads are separately performable on the right section, the middle section and the left section of the frame, wherein a first number is set in the right section with the beads, a second number is set in the left section with the beads and a result of a mathematical operation of the first number and the second number is resulted in the middle section with the beads.

5. The improved abacus of claim 4, further compromising a first positive and negative indicator disposed on the frame proximate the right section and a second positive and negative indicator disposed on the frame proximate the left section, wherein the positive and negative indicators are adapted to represent the positive or negative sign of the first number and the second number.

6. The improved abacus of claim 1, further comprising a decimal point indicator slidably disposed on the horizontal bar.

7. The improved abacus of claim 1, further compromising an operational sign adapted to indicate the type of the operation to be performed.

8. The improved abacus of claim 1, further compromising a positive/negative indicator disposed on the frame, wherein the positive/negative indicator is adapted to represent the positive or negative sign of numbers used in mathematical operations.

9. An improved abacus for use by an individual to make mathematical calculations, the improved abacus comprising:
a frame;
a plurality of vertical rods positioned parallel to each other across the frame, wherein each vertical rod represents a column of numbers,
a plurality of movable beads positioned on each rod, wherein the beads are divided into two unequal sections by a horizontal bar that is perpendicular to the rods; and
a mathematical operation indicator disposed in the frame, wherein the mathematical operation indicator is adapted to expose and cover more than one mathematical operation sign, wherein one row of the beads is below the horizontal bar and four rows of beads are above the horizontal bar, wherein each of the beads below the horizontal bar are assigned a value of 1 and each of the beads above the horizontal bar are assigned a value of 2.

* * * * *